(12) United States Patent
Pettersson et al.

(10) Patent No.: US 8,116,297 B2
(45) Date of Patent: *Feb. 14, 2012

(54) ROUTING DATA PACKETS FROM A MOVING NETWORK TO A HOME NETWORK

(75) Inventors: Mattias Pettersson, Lund (SE); Tony Larsson, Upplands Väsby (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 747 days.

This patent is subject to a terminal disclaimer.

(21) Appl. No.: 12/097,890

(22) PCT Filed: Dec. 23, 2005

(86) PCT No.: PCT/EP2005/057163
§ 371 (c)(1),
(2), (4) Date: Oct. 21, 2008

(87) PCT Pub. No.: WO2007/073775
PCT Pub. Date: Jul. 5, 2007

(65) Prior Publication Data
US 2009/0316623 A1    Dec. 24, 2009

(51) Int. Cl.
*H04J 3/24*    (2006.01)

(52) U.S. Cl. .................. 370/349; 370/401; 455/433
(58) Field of Classification Search .............. 370/401, 370/349, 331; 455/433; 709/249
See application file for complete search history.

(56) References Cited

U.S. PATENT DOCUMENTS

| 7,539,202 | B2 * | 5/2009 | Thubert et al. | 370/401 |
| 2009/0257346 | A1 * | 10/2009 | Ng et al. | 370/217 |

* cited by examiner

*Primary Examiner* — Kevin C Harper
*Assistant Examiner* — Henry Baron

(57) ABSTRACT

A system, method, and router for routing data packets from a moving network to an associated home network. A data packet originating from a mobile network node in the moving network is routed over any of a number of external accesses accessible from different mobile routers, which advertise different address prefixes to mobile network nodes. A first mobile router advertising a first address prefix receives a data packet with a source address with the first address prefix, and selects an external access for routing that is accessible from a second mobile router advertising a second address prefix. The first mobile router detects that the source address of the packet is different from the second address prefix and provides the packet with a different source address with the second address prefix. The first mobile router then transmits the packet to the second mobile router for transmission to the home network.

17 Claims, 11 Drawing Sheets

ROUTING DATA PACKETS FROM A MOVING NETWORK TO A HOME NETWORK

FIELD OF THE INVENTION

The present invention relates to communication systems, methods and mobile routers for routing data packets from a moving network to a home network, and more particularly it relates to methods, communication systems and mobile routers for routing data packets from a moving network which has more than one mobile router, each mobile router having access to at least one external access, to a home agent of any of the mobile routers.

BACKGROUND

This document deals with mobility for a moving network, which is defined as a network that is movable in relation to its home network. A moving network can change its point of attachment to a fixed infrastructure or it may have many points of attachment to a fixed infrastructure, but it is still able to communicate with a home network through a mobile router having access to an external access through which all communication nodes in the moving network can communicate. Such a communication node in a moving network is called a moving network node. In the case of a moving network on e.g. an airplane, the moving network will comprise communication nodes, which may be different users' communication devices, such as laptops, mobile phones, PDAs (Personal Digital Assistants) etc., which communication nodes communicate wireless or wireline with a mobile router within the airplane, such that all communication destined to an external address will pass via the mobile router. A moving network may also be e.g. a Personal Area Network (PAN), wherein a PAN comprises all communication devices belonging to a user and situated within short range radio communication distance from each other. In this document, each node in the moving network or connected to the moving network that works like a router for data originating from a moving network node and destined to an address external of the moving network is defined as a mobile router. Examples of such mobile routers are: a PAN device working as a router in a PAN, and a router in a moving network on a vehicle. Note that a node may have both roles, i.e. being both a moving network node and a mobile router, for example a PAN device such as a mobile phone in a PAN.

"The Network Mobility (NEMO) Basic Support Protocol", by Devarapalli et al, published January 2005 as a Request For Comments 3963 by the Internet Engineering Task Force, identifies a protocol that enables a moving network to attach to different points in the Internet. The protocol is an extension of Mobile IPv6, and allows session continuity for every communication node (or communication device) in the moving network as the moving network moves. It allows a mobile router to maintain a stable network address prefix for a moving network, even as the mobile router changes its, and thus the moving network's, point of attachment to a fixed network infrastructure. This prefix stability is achieved through a solution similar to the mobile IPv6 solution, i.e. by making a home agent (HA) in the home network of the mobile router a fixed point of attachment for the Mobile Router (MR) and maintaining connectivity between the HA and the MR through a tunnel. The address prefix, which is called Mobile network prefix (MNP) in the NEMO protocol, is allocated from the address range of the home network, and can thus remain the same even as the MR and its network move. When the MR attaches to a network in a new location, it acquires a new care-of address in the new network, which care-of address is used to locate the MR in the new network, but its home address and address prefix are unchanged. However, just like in Mobile IPv6 the MR has to register its new care-of address in the HA in order to maintain the tunnel between the Mobile Router and the Home Agent.

If, in the current NEMO solution, a bad tunnel is experienced, it will be replaced by a new tunnel by performing a new registration with the HA, this time with a different care-of address, unless the tunnel is re-established through the same interface and point of attachment, and possibly configured on a different interface, depending on the nature of the tunnel problems. If a communication node could get Internet access through multiple access media simultaneously, i.e. the moving network could have multiple tunnels established simultaneously, a data flow could be moved from a bad tunnel to a good tunnel much quicker than if only one tunnel at a time can be established. Also, for matters of cost, bandwidth, delay etc. it could be useful for a communication node to get Internet access through multiple simultaneous tunnels. However, the NEMO basic support protocol does not allow this because it allows only a single care-of address to be registered in the Home Agent (HA) for a certain Mobile Router (MR) at any one time. Multiple simultaneous care-of addresses are not allowed and thus multiple simultaneous accesses and MR-HA tunnels are not possible for a MR.

Although, such a procedure for managing different external access resources simultaneously accessible by a mobile router in a moving network is suggested in the co-pending patent application PCT/SE2004/001578 by the same applicant. For this reason, a tunnel is set up over each of the different external access resources available from the mobile router such that the external accesses are simultaneously accessible. To be able to fully make use of the different external access resources, this procedure suggests that the mobile router controls the use of the different external access resources for data packets sent between the mobile router and the home agent of the mobile router. To achieve this, the mobile router classifies a data packet based on information in the packet and selects an access resource for sending the packet based on the classification and on information of the different external access resources.

The procedure described above only discusses a moving network having one mobile router with a plurality of external access possibilities. Although, it may happen that all external accesses present in an area are not handled by one and the same mobile router. For example, on a train there may be a fixed mobile router mounted in each railway-carriage. Also, for technical reasons, different external accesses may not be handled by the same mobile router. Therefore, to be able to give the moving network nodes in a moving network the ability to use all external accesses that are present in an area, a procedure for managing different external access resources simultaneously accessible by more than one mobile router in a moving network is suggested in the co-pending patent application PCT/SE2004/001994 by the same applicant.

In the procedure described in PCT/2004/001994, the more than one mobile routers forward traffic between each other so that the correct access is used independently of how the mobile network nodes behave. In this procedure, the same mobile network prefix (MNP), i.e. address prefix, is used by all mobile routers in the moving network. This is the case for example when the mobile routers have the same home network, e.g. same home agent in the same home network.

Although, in some cases it may happen that the moving network has multiple MRs but they are unsynchronized with regards to address prefix management. This means that an MR may be assigned an address prefix or MNP different from what another MR in the same moving network is using. The MRs may connect to the same or to different HAs. The MRs are assigned different address prefixes from their HAs and they advertise them into the moving network. Although, it is still of interest to be able to use all external access of the moving network for all MNNs. The focus of the solution is to let the MRs perform external access selection for the flows of the MNNs in the most flexible manner. Therefore, it would be desirable if it would be possible to use any of the external accesses accessible from any of the MRs for routing data packets originating from any of the MNNs to a home agent of the moving network, also in the case where the MRs in the moving network are unsynchronized with regards to prefix management (e.g. they are allocated different prefixes).

The term flow or data flow used in the application is a loose term for a connection between two end nodes. A flow between a first and a second end node may have two directions: from the first node to the second node and vice versa. Thus, in the application, a data flow comprises an uplink part and a downlink part, wherein the uplink part is in the direction from the moving network node to the home agent (and further to the correspondent node), and the downlink part is in the direction from the home agent to the moving network node. A TCP (Transmission Control Protocol) connection is typically seen as a flow. A node can have multiple flows towards different correspondent nodes and also multiple flows towards the same correspondent node. Each flow comprises data packets. A flow is typically defined by the source and destination IP addresses and port numbers, plus the transport protocol in use, such as TCP or UDP (User Datagram Protocol). It is also possible to instead define a flow by its flow label (in IPv6) or its SPI (Security Parameter Index) together with the source and destination IP addresses, and the protocol in case of the SPI. The flow label is more specific than the port numbers and should have precedence over them. The SPI is used in IPsec (IP security as defined in RFC 2401 "Security Architecture for the Internet Protocol"), together with the destination IP address and the protocol to identify the security association, and the SPI-destination address-protocol triplet is typically used as a (unidirectional) flow identifier when the packet is encrypted and the port numbers are visible only to the receiving end-node.

The term external access or link defines one possible way of getting external access from the moving network. Each external access does not have to be of different types, although this is the most natural case. It may be possible that two external accesses are of the same type but differ in terms of e.g. current load or operator. There is one (primary) tunnel established between a Mobile Router and a Home Agent per external access.

The term Home Agent used in the application should be interpreted as any node in a home network working like a mobile anchor point to the moving network, i.e. facilitating communication from the moving network over an external network and the home network, such that the present invention can be used.

SUMMARY

An object of the present invention is to make it possible for a data packet originating from a mobile network node in a moving network to be routed over any of a number of external accesses accessible from different mobile routers in the moving network to home network(s) related to the moving network, for the case where some of the mobile routers advertise different address prefixes to the mobile network nodes.

The above object is achieved by a method, a system, a mobile router and a computer program product set forth in the characterizing part of the independent claims.

According to a first aspect of the invention, a method in a communication system is provided for routing data packets, said data packets originating from a moving network node in a moving network, from a mobile router of the moving network to a home agent in a home network related to the moving network. A first mobile router of the moving network has ability to access a first external access over which first external access a primary tunnel is set up to a home agent of the first mobile router. The moving network also has a second mobile router, which has ability to access at least one other external access, over each of the at least one other external access one primary tunnel is set up to a home agent of the second mobile router. The first mobile router advertises a first address prefix, and the second mobile router advertises a second address prefix, and a data packet originating from the moving network node is associated with a source address having the first address prefix. The method comprising the steps of:

selecting an external access of said at least one other external access for routing the data packet to the home agent of the second mobile router;

detecting that the source address associated with the data packet has an address prefix different to the address prefix advertised by the second mobile router;

providing the data packet with a different source address usable for routing the data packet to the home agent of the second mobile router, which different source address has the second address prefix; and transmitting the data packet via the selected external access to the home agent of the second mobile router.

According to a first embodiment of the invention, a solution using secondary tunnels from the first mobile router via the second mobile router and the home agent of the second mobile router to the home agent of the first mobile router is provided. In this first embodiment, the data packet is provided with a different source address by adding an address related to the first mobile router to the data packet, said address related to the first mobile router having the second address prefix. The packet is then transmitted with the address related to the first mobile router through the secondary tunnel to the first mobile router.

According to a second embodiment of the invention, a solution using address translation functions in the mobile routers is provided. In this second embodiment, the data packet is provided with a different source address by translating the source address associated with the data packet to a second source address having the second address prefix.

An advantage of the present invention is that it increases throughput from and to a moving network since it makes it possible to use all external accesses available from the moving network, regardless of which mobile router that provides the access. Thereby, more redundancy is also achieved.

Another advantage of the invention is that the traffic from and to the moving network can be more flexibly load-balanced over the different external accesses.

A further advantage of the invention is that no changes or additions to the mobile network nodes are required. Instead, new features or requirements of the invention are placed on the mobile routers, or, in some embodiments, on other nodes in the communication system. Thereby, also legacy devices could be used as mobile network nodes with the invention.

A still further advantage of the invention is that it provides support for uncoordinated Mobile Network Prefixes among the MRs while still honouring ingress filtering rules.

Yet another advantage is that it provides support for multiple mobile routers having different home agents.

More advantages of the invention will be apparent when reading the application.

BRIEF DESCRIPTION OF THE DRAWINGS

The invention will in the following be described in more detail with reference to enclosed drawings, wherein.

DETAILED DESCRIPTION

Figure 1:
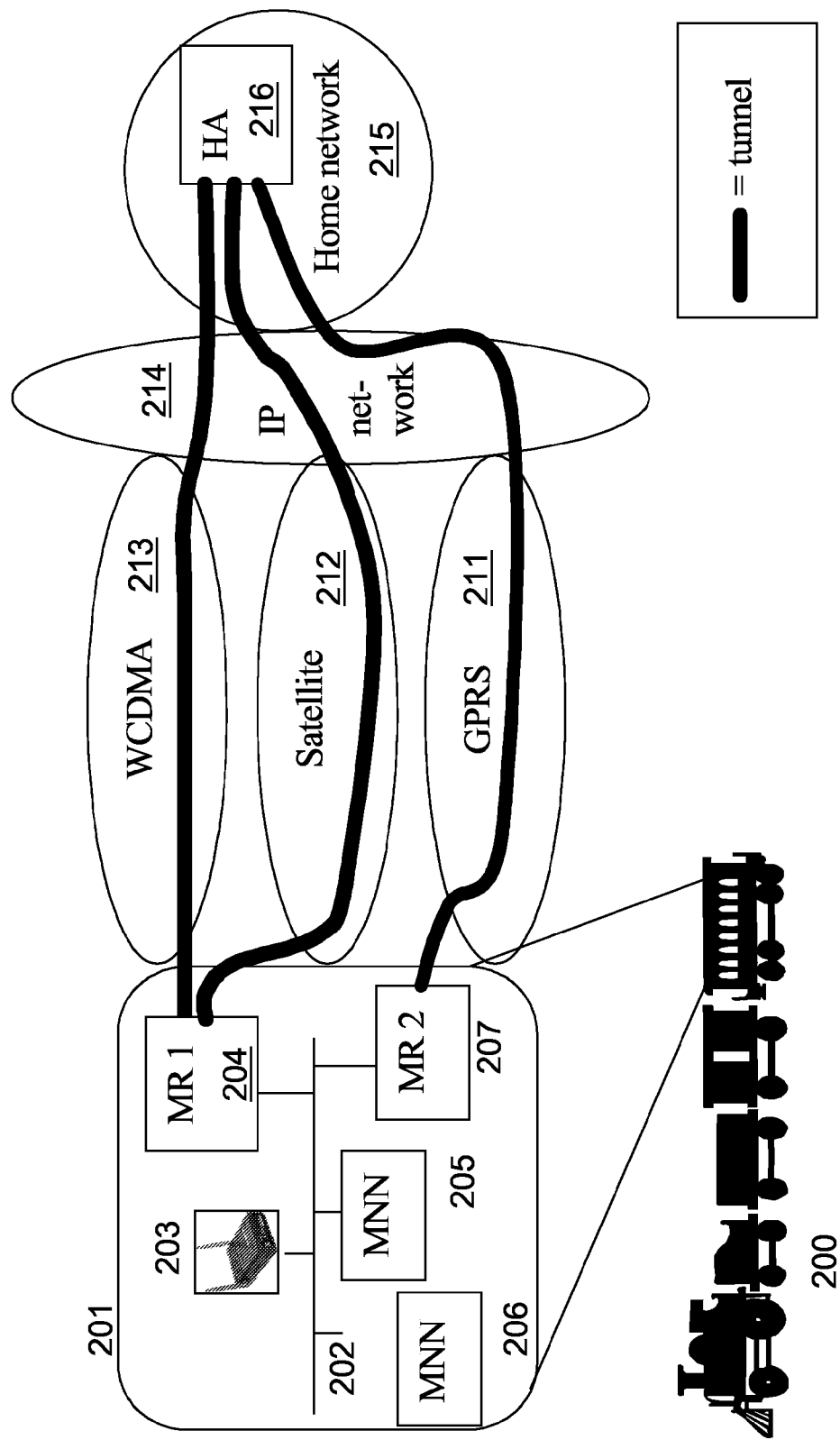
FIG. 1 describes a schematic block diagram of a communication system wherein the present invention may be used, the communication system comprising a Vehicle Area Network (VAN)

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 3:
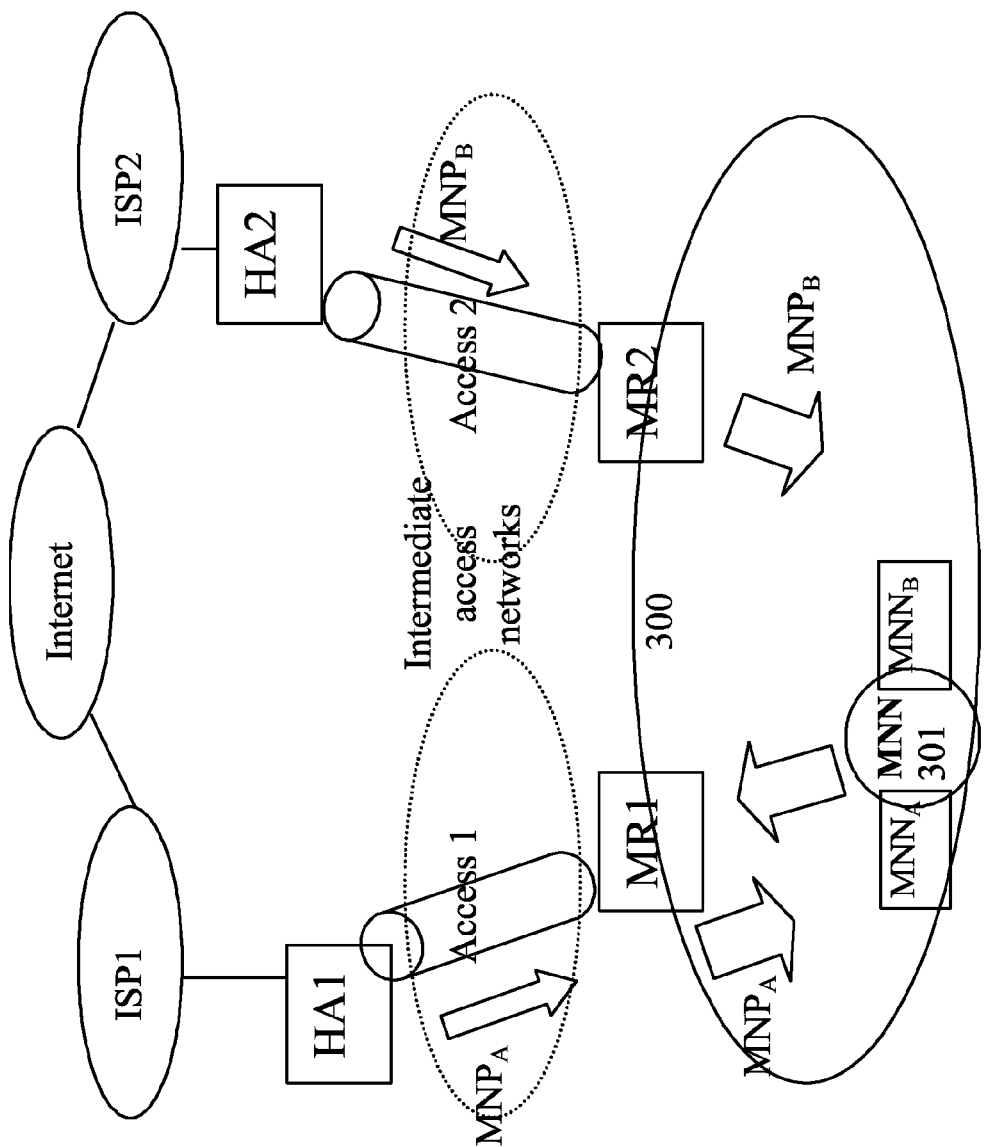
FIG. 3 shows a schematic block diagram of a communication system wherein the present invention may be used, including arrows illustrating how address prefixes are delegated and advertised in the communication system.

FIG. 1 shows a schematic block diagram of an exemplary communication system wherein the present invention can be used. The system has a Vehicle Area Network (VAN) 201 which is an example of a moving network for which the present invention can be used. The VAN 201 is in this case situated on a train 200, which may be moving. The VAN may be some sort of switched Ethernet that may have either Ethernet ports 202 or WLAN access points 203 or a combination of Ethernet ports and WLAN access points (as shown in the figure). Moving network nodes (MNNs) 205, 206 may connect to an Ethernet port or to a WLAN access point. The moving network nodes may be any communication node such as laptops or mobile phones belonging to persons travelling on the train. The exemplary VAN also has a first and a second Mobile Router (MR) 204, 207 which act as default gateways for the MNNs inside the vehicle, such that a data packet sent from a moving network and directed to an external network address can be sent via any of the mobile routers. The mobile routers 204, 207 are responsible for mobility management for the entire VAN 201, i.e. mobility management is totally transparent to the MNNs 205, 206 entering the vehicle. This means that no new requirements are put on the MNNs when joining the VAN. In this figure, the first and the second mobile router have the same home agent 215 in the same home network. Although, it may be possible that the first and the second mobile routers have different home agents that can reside in the same home network or in different home networks. Of course, it is also possible to have more than two mobile routers offering external access. Earlier solutions have catered for the case where the mobile routers have the same address prefix from the address range of the home network. This invention caters for the case where the mobile routers have different address prefixes. For the purpose of routing packets destined to an external network address, the first and the second mobile router 204, 207 have external accesses for the VAN comprising one or several different access networks. In FIG. 3 the first mobile router 204 has two external accesses, a first external access via a Wideband Code Division Multiple Access (WCDMA) network 213 and a second external access via a satellite radio communication network 212. The second mobile router 207 has one external access via a General Packet Radio Service (GPRS) network 211. Each of these access networks is available via geographically distributed access points belonging to each access network, as is well known in the art. One or several of these access networks can be available at the same time depending on for instance coverage and operator policies. FIG. 1 also shows a Home Agent (HA) 216 in a home network 215, which in the example is the home network for both the first mobile router 204 and the second mobile router 207. Data packets from any of the MNNs and destined for e.g. a correspondent node in a foreign network is routed via any of the access networks, an IP network 214 and via the home agent 216 in the home network 215. For this purpose, a first tunnel is set up from the first mobile router 204 over the WCDMA network 213 and the IP network to the home agent 216 in the home network 215, a second tunnel is set up from the first mobile router 204 over the satellite communication network 212 and the IP network to the home agent 216 and a third tunnel is set up from the second mobile router 207 over the GPRS network 211 and the IP network to the home agent. It is also possible that two mobile routers have the same type of access, e.g. that both MRs have WCDMA access. According to the invention, the different external accesses offered by the networks 211, 212, 213 can be used simultaneously by the moving network, as will be described later.

There are several reasons motivating why support for simultaneous usage of several accesses would be beneficial in the scenario of FIG. 1:

It would be possible to handle the dynamic nature of the external accesses, i.e. the fact that accesses will go up and down depending on access technology and coverage. By having multiple simultaneous accesses, the MRs will be able to quickly move traffic between the different accesses when for instance one access goes down. According to the invention, moving traffic can take place both between two accesses of a single MR or between two accesses of two different MRs.

Simultaneous use of multiple external accesses means more bandwidth to the users of the moving network nodes in the moving network, which would improve the communication possibilities for the moving network nodes.

Also, to do load-sharing between the different external accesses, using different load-sharing algorithms, would improve the performance of the system and the users' system experience.

Figure 2:
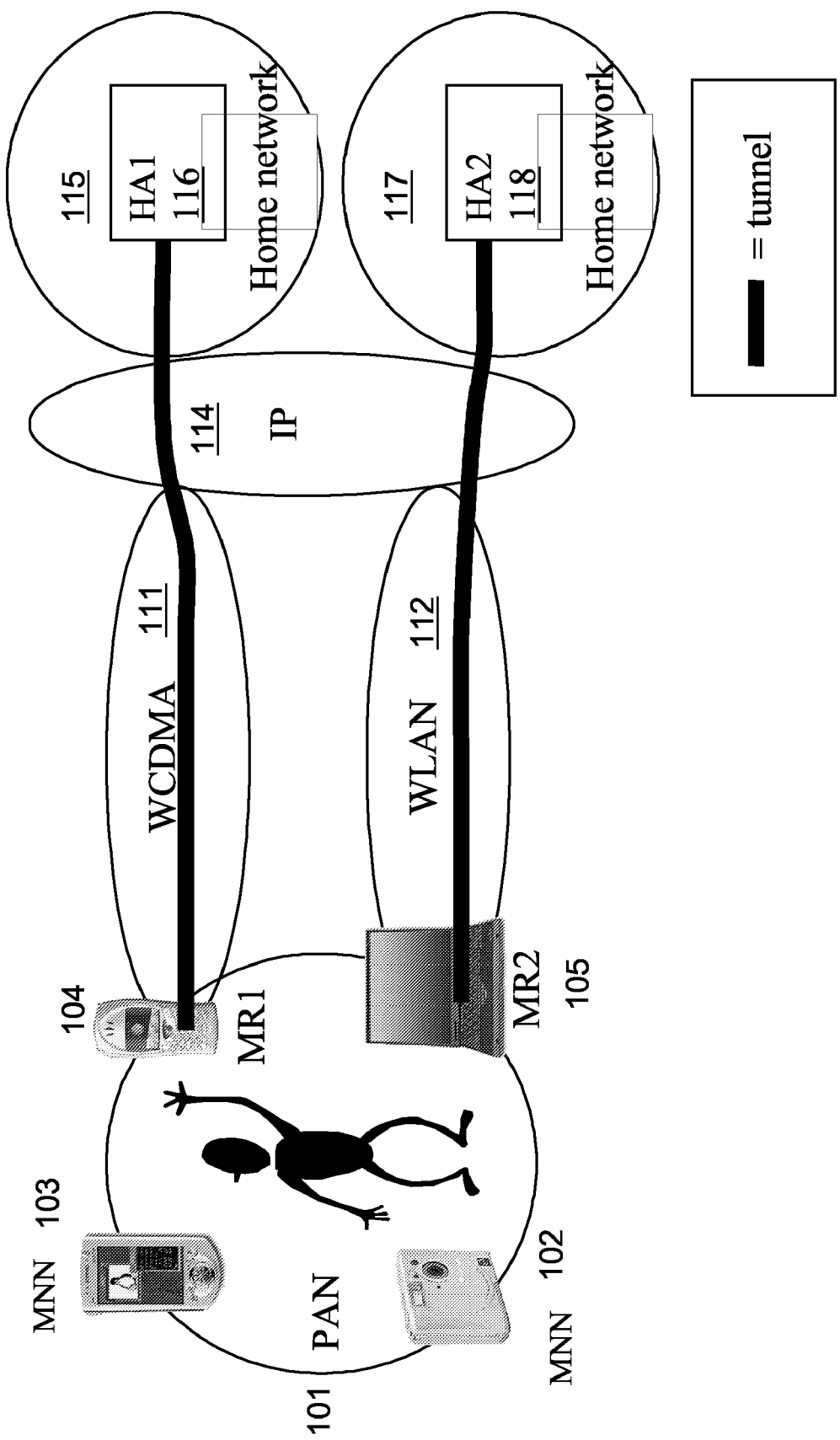
FIG. 2 shows a schematic block diagram of another communication system wherein the present invention may be used, the communication system comprising a Personal Area Network (PAN)

FIG. 2 shows another exemplary communication system wherein the present invention can be used. In this example, the moving network is a Personal Area Network (PAN). A PAN is a network that wirelessly connects communication devices being in the vicinity of a user into a short-range communication network. The PAN is then constituted by the communication devices that are within short-range communication distance of each other. The PAN can for instance comprise the communication devices that the user is carrying with him/her or the network within the user's personal car. The PAN consists of a switched Ethernet network based on for instance Bluetooth running the PAN profile. Some of the PAN devices have external access facilities. The external access facilities of these PAN devices can be used by all devices in the PAN to get external access. Thereby, the PAN devices having external access facilities function as mobile routers for the PAN.

The PAN 101 according to FIG. 2 comprises PAN devices 102-105, from which the two PAN devices 104, 105 have external access possibilities and, consequently, act as mobile routers (MRs) for external network access. The MRs 104, 105 are also responsible for mobility management of the moving network, i.e. the PAN. The external accesses provided by the MRs can for instance be a cellular phone 104 providing WCDMA access 111 and a PDA 105 providing WLAN access 112. These accesses can according to the invention be available at the same time and the solutions/mechanisms described in this application look into the cases where the PAN has several MRs providing one or several external access each. Compared to the VAN with multiple MRs shown in FIG. 1, in this example, the MRs in the PAN have different Home Agents 116, 118. As in the example of FIG. 1, the MRs have different address prefixes, which they have received from their respective home network 115, 117. The MRs are communicating with its respective Home Agent (HA) deployed in the respective home network via tunnels setup to the respective home agent for each available external access. The example in FIG. 2 shows that MR1 has access to one tunnel to HA1 116, and that MR2 has access to one tunnel to HA2 118.

The main advantages achieved by having support for simultaneous multi-access for PANs are:

Being able to move traffic between accesses (and MRs) when links go up and down when for instance the user moves out of coverage for WLAN. This case can also occur if one of the MRs 'disappears' from the PAN, e.g. moves out of Bluetooth coverage or simply is switched off.

That a user of the PAN can select which access and MR to use and change the selection, e.g. if the user for some reason wishes to change access and move the traffic from one access to another (which may also mean moving the traffic from one MR to another). The reasons for the user to change MR may be, e.g., cost-reasons, corporate policy reasons etc.

That a greater accumulated bandwidth can be provided for external network access for the PAN, since traffic can use different accesses, i.e. some traffic can use for instance the cellular access and other traffic can use the WLAN access.

As mentioned, this invention deals with the scenario where the moving network has multiple MRs but they are unsynchronized with regards to address prefix management. This means that at least one MR in the moving network may be assigned an address prefix different from what another MR in the moving network is using. The MRs may connect to the same HA or to different HAs (see FIGS. 1 and 2). An example of an address prefix is a so called mobile network prefix (MNP) as defined in NEMO. The MRs are assigned different MNPs from their respective HA (or they are pre-configured with static MNPs), and they advertise the MNPs into the moving network, i.e. to the MNNs.

An object of the invention is to make it possible for a data packet originating from an MNN to be routed over any of the external accesses accessible from the moving network, also in the case where the data packet has an originating address with an address prefix different to the address prefix advertised by some of the mobile routers providing the external accesses in the mobile network. Then flow management policies could be used for all external accesses of a moving network. Thereby, the external accesses could be used in a more optimal way for each type of data flow from the moving network, depending e.g. on the type of data flow and/or the load on each external access. A likely scenario for this invention is the PAN with multiple MRs scenario, which, as described in FIG. 2, may have multiple MRs using different HAs using different (unsynchronized) MNPs. Still the devices in a PAN (including the multiple MRs) are under the control of a single owner/administrator and are thus likely to be synchronized in other respects that are internal to the PAN, such as flow management policies.

Today, all MRs in a moving network advertise themselves as default routers to the MNNs in the moving network. The MNN will arbitrarily select one of them for sending default route traffic to (which in practice means most traffic). This may conflict with any flow management policies defined for the MRs, as a certain policy may indicate that this particular flow should be routed over a specific external access that belongs to another MR than the one the MNN selected.

FIG. 3 shows a schematic block diagram of a communication system wherein the present invention may be used, including arrows illustrating how address prefixes are delegated and advertised in the communication system. FIG. 3 shows a moving network 300 with two mobile routers (MR1 and MR2) connecting over tunnels over different external accesses to different HAs (HA1, HA2) with different address space originating from different ISPs (ISP1, ISP2). Assume MR1 has been assigned a first mobile network prefix ($MNP_A$) from its HA (HA1). Also assume that MR2 has been assigned a second mobile network prefix ($MNP_B$) from its HA (HA2). It may also be possible that the MRs have the same HA but still different address space. MR1 will advertise $MNP_A$ to the moving network and MR2 will advertise $MNP_B$ to the same moving network. Thus, the MNN 301 will hear two default routers (MR1 and MR2) and it will add the two prefixes to its prefix list and configure addresses from each prefix. Consequently, a source address, i.e. an address identifying the origin of a data packet sent from the MNN, could either be $MNN_A$ or $MNN_B$. A packet also has a destination address identifying to where the packet is destined.

According to the IETF Request For Comments (RFC) 2461, called "Neighbor Discovery for IP version 6 (IPv6)" by Narten et al published December 1998, an MNN may arbitrarily select a default router as its primary default router to which it will set its default route. It will use this default router for all or almost all traffic, including use of both source addresses $MNN_A$ and $MNN_B$. The MNN is not required to associate $MNN_A$ with MR1 and $MNN_B$ with MR2. In FIG. 3, the MNN has used MR1 as its default router (illustrated by the arrow pointing from the MNN to MR1).

In existing communication systems there is a function called ingress filtering, which is used to stop incorrect or malicious packets from being delivered out from a network, e.g. a moving network and further on to the Internet. This is performed by any node in a communication system by inspecting that the source address used in packets directed towards the Internet is topologically correct. The node, e.g. a mobile router in a moving network, knows what address space that is used below itself and only packets with a source address from that address space is let through. In the case of FIG. 3, any of the nodes MR2, HA2 or ISP2 or any other router in HA2's home network or ISP2's network, may perform ingress filtering and drop the packet if the source address $MNN_A$ is used, because $MNN_A$ is derived from $MNP_A$ which is not part of the address space that MR2's $MNP_B$ belongs to. According to today's standards for moving network nodes, an MNN will send all its traffic (all its flows) to the same default router, as long as it has not received any other routing instructions. This means that the MNN will not be able to send one flow to MR1 while sending a second flow to MR2. If MR2 receives a packet with the wrong source address, i.e. $MNN_A$, the packet is forwarded to MR1 before an external access is selected. The packet will not be filtered out in MR2 because it is as yet only sent within the moving network.

In the scenario of FIG. 3, the invention aims at making it possible for the MNN to use the access accessible from MR2 even if the MNN uses the source address $MNN_A$, or generally speaking, the invention aims at making it possible to route a data packet originating from the MNN over any external access accessible from any mobile router in the moving network, irrespective of which source address the data packet has. In other words, this invention allows the MRs of the moving network to freely select the external access for each data flow between any MNN in the moving network and any corresponding node in the Internet, so that this selection is independent of the source address selected by each MNN.

To overcome the situation when an MNN has selected one source address for a packet, which source address has a first address prefix, but this first address prefix does not match a second address prefix that should be used for the selected external access, it is suggested in this invention to provide the data packet with a different source address used for routing the packet at least to the home agent of the second mobile router, which different source address has the second address prefix. This different source address will then be used for transmitting the data packet over the selected external access, at least to the home agent of the second mobile router. According to a first embodiment of the invention, secondary tunnels set up through the primary tunnels are used. In this case, the different source address will be added to the data packet by the first mobile router, which different source address is an address related to the first mobile router but having the address prefix advertised by the second mobile router. The address related to the first mobile router may e.g. be a start address for the secondary tunnel set up through the second mobile router over the selected external access having the second address prefix. According to a second embodiment, network address translation functions are used, e.g. a Network Address Translators (NAT). The network address translation function provides the data packet with the different source address by translating the source address associated with the data packet to an address having the second address prefix.

Figure 4:
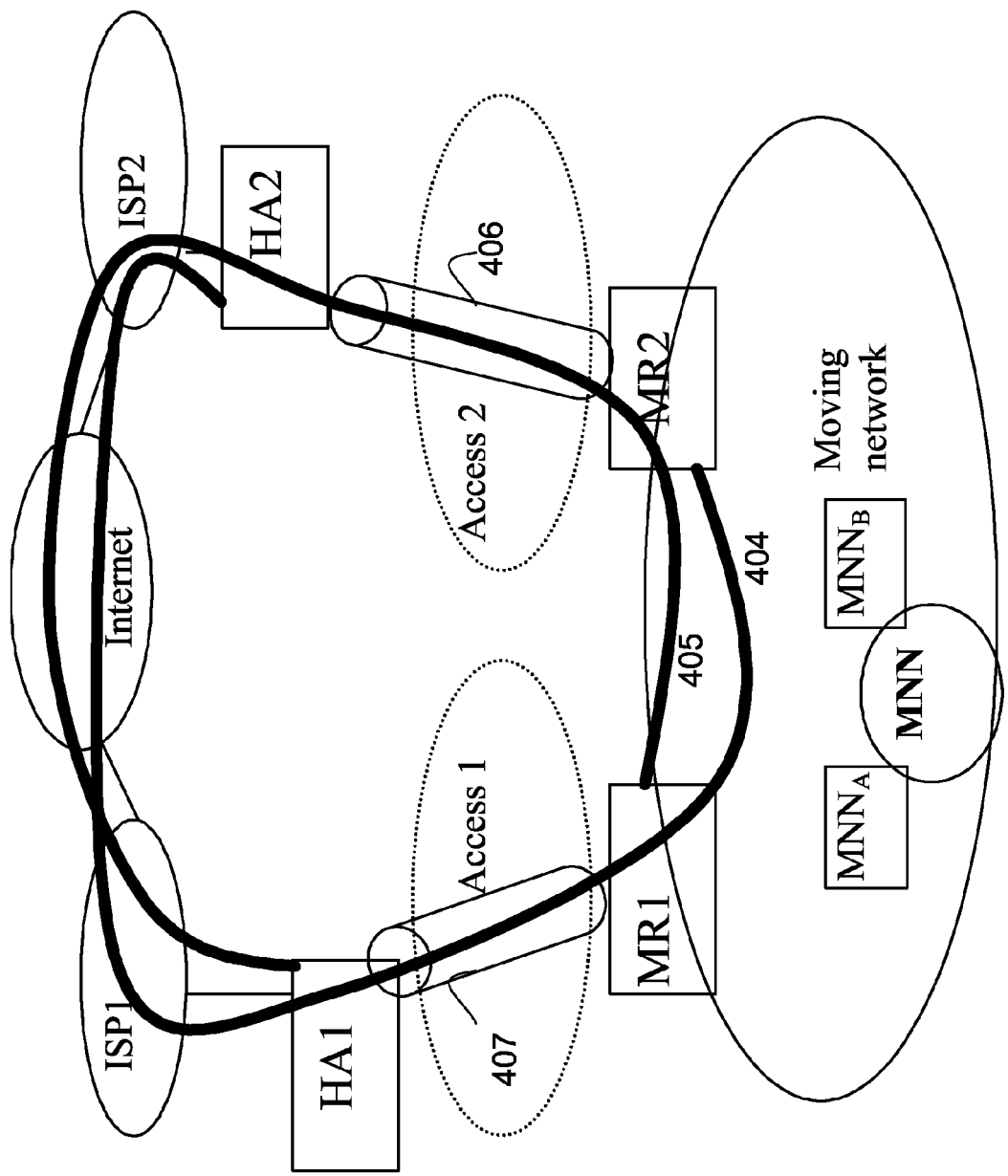
FIG. 4 describes a schematic block diagram of a first embodiment of the invention used in a communication system.

According to the first embodiment, a mesh of secondary additional tunnels is created between MRs and their HAs over external accesses of the other MRs in the moving network which use a different address prefix than the MRs creating secondary tunnels. These tunnels use the ordinary (primary) already established tunnels between the MRs with the ability to access the external accesses and their HAs. An MR will establish secondary tunnels towards its HA using the primary tunnels of all the other MRs that use a different address prefix. The secondary tunnels will have a start address in the starting point of the tunnel and an end address in the end point of the tunnel. Practically, a secondary tunnel is created by creating a logical tunnel interface in the starting point and in the endpoint. When transmitting a packet through the secondary tunnel, an extra packet header is appended to the original header, which packet header comprises the start address and the end address of the secondary tunnel. Thereby, tunnels inside other tunnels will be used for transmitting packets, which due to the extra packet header means some additional overhead. This is illustrated in FIG. 4, which shows the same exemplary communication system as in FIG. 3 but with the new secondary tunnels set up. The black thick lines 404, 405 show the secondary tunnels, whereas the tubes 406, 407 show the primary tunnels. Assume that the MNN selects $MNN_A$ as its source address for a data packet to be transmitted to a correspondent node. The MR1 either receives the data packet directly from the MNN, if the MNN has selected the MR1 as its default router, or it receives the data packet from MR2, if MR2 is the default router. In MR1, the external access (Access 2) of the second MR (MR2) is selected. If the packet would be forwarded to MR2 and through the primary tunnel of the selected external access, there will be ingress filtering problems in MR2. Therefore, according to the invention MR1 will send the packet over a secondary tunnel to the home agent HA1 of MR1, i.e. HA1. This secondary tunnel goes via the selected external access of MR2 and passing by MR2's home agent HA2. Since the secondary tunnel is used, an alternative source address is added to the packet, which alternative source address has the address prefix of MR2. The alternative source address may for example be the start address of the tunnel. In this case the start address of the tunnel would have the same address prefix as the second mobile router.

Figure 5:
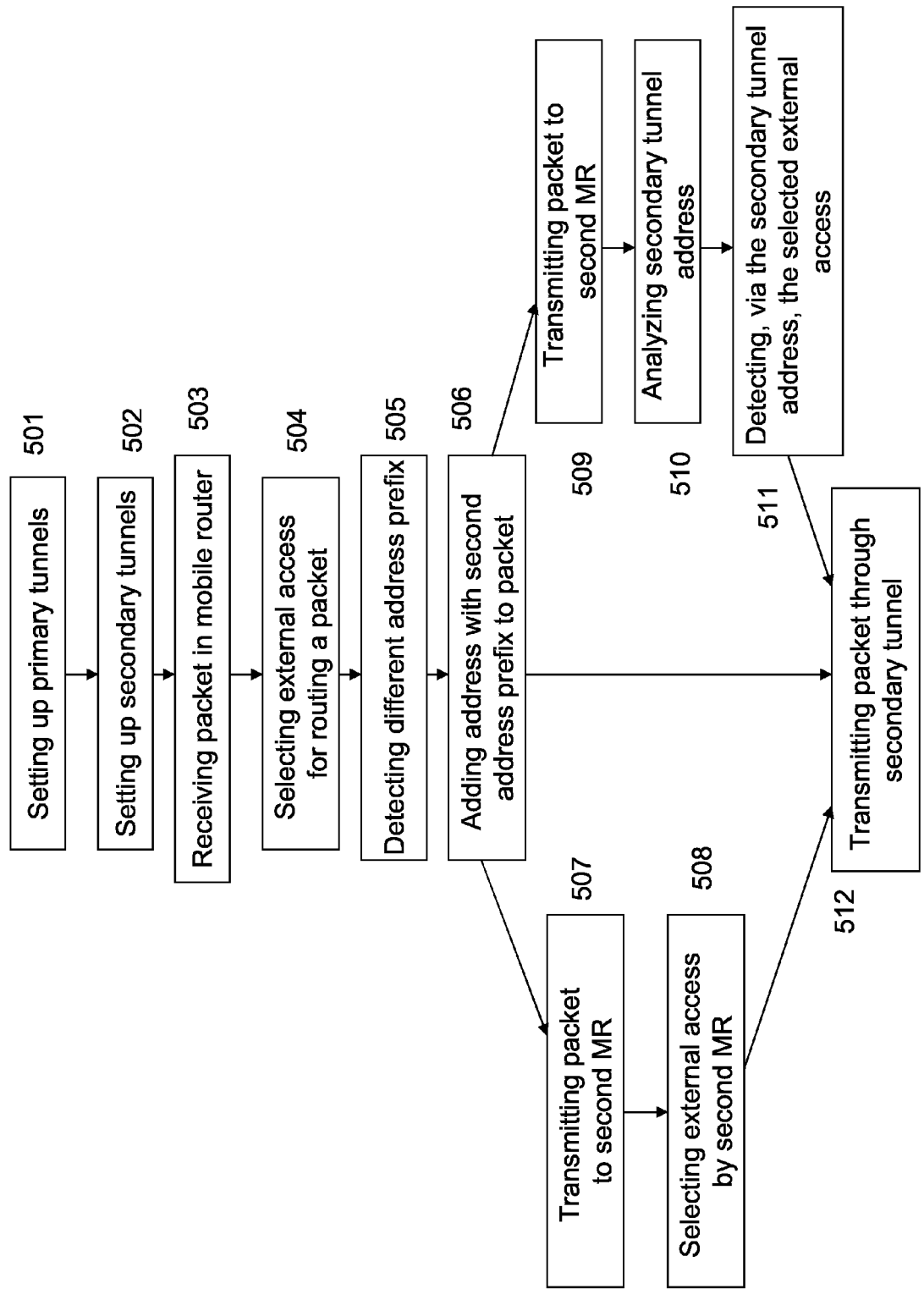
FIG. 5 describes a flow chart according to the first embodiment of the invention.

FIG. 5 shows a flow chart according to a method of the first embodiment of the invention for an exemplary embodiment with two different mobile routers, a first and a second mobile router, advertising different address prefixes. The method starts by setting up 501 a primary tunnel over each external access available from the moving network to a home network, from the mobile router that has the ability to access the external access to the home agent of that mobile router. Thereafter, secondary tunnels are set up 502, from the first mobile router via the second mobile router and the home agent of the second mobile router to the home agent of the first mobile router, and from the second mobile router via the first mobile router and the home agent of the first mobile router to the home agent of the second mobile router. If the mobile router where a secondary tunnel starts is configured not to encrypt packets, one secondary tunnel from this mobile router through another mobile router to the home agent of the other mobile router to the home agent of the mobile router would be sufficient, irrespective of the number of external accesses accessible by the other mobile router. Although, if the mobile router where a secondary tunnel starts is configured to encrypt packets, one secondary tunnel per external access accessible by another mobile router would be necessary all the way from this mobile router to the home agent of the mobile router. These two alternatives will be described more thoroughly further down in the document.

A data packet originating from a mobile network node in the moving network and destined to an address external of the moving network is received 503 at a mobile router using the same address prefix as the address prefix of the source address of the packet, in this example the first mobile router. The first mobile router receives the packet either from a mobile network node directly, or, if the source address prefix of the packet was different to the address prefix of the mobile router first receiving the packet, from this mobile router. Then, an external access is selected 504 by the moving network, e.g. by the first mobile router, based on e.g. flow management policies. Further down in this document, it is described in an embodiment how this external access selection can be accomplished. Thereafter, it is detected 505 that the source address of the packet has a different address prefix than the prefix (or prefixes) advertised by the mobile router that has access to the selected external access. Then an alternative source address with the second address prefix is added 506 to the packet. This alternative address is for example added as a new address header embracing the original source address, and used for tunnelling the packet. The alternative source address may be an address of the first mobile router but with the address prefix of the second mobile router.

According to a first alternative, the packet is then transmitted 512 through a secondary tunnel from the first mobile router over the selected external access to a home agent of the first mobile router. Due to the tunnel and its alternative source address, the packet could be delivered to a home network of a first mobile router via an external access of the second mobile router without being filtered out due to wrong address prefix in any intermediate node. The receiving home agent can then distribute the packet via e.g. the Internet to the recipient of the packet.

FIG. 5 also describes a second alternative and a third alternative of the first embodiment of the invention. In the second alternative, the packet is not encrypted by the first mobile router. In that case, the first mobile router transmits 507 the data packet via a secondary tunnel from the first mobile router to the second mobile router, which second mobile router selects 508, by inspecting the data packet, the same external access as was selected by the first mobile router. Since the second mobile router uses the same flow management policy for the selection as the first mobile router, the same external access will be selected. Thereafter, the packet is transmitted 512 through the secondary tunnel over the selected access, which secondary tunnel ends in a home agent with the same address prefix as the original source address of the packet, i.e. the home agent of the first mobile router. Since no data encryption is used by the first mobile router, the second mobile router and the home agent of the second mobile router has access to the data in the packets transmitted through the secondary tunnel of the first mobile router and can thus make flow management decisions that are equal to the decisions made by the first mobile router or the home agent of the first mobile router (if the packet is transmitted in the opposite direction). Therefore, a common secondary tunnel could be used for the transmission from the first mobile router to the second mobile router, and from the home agent of the second mobile router to the home agent of the first mobile router for packets that are transferred through either of the primary tunnels between the second mobile router and the home agent of the second mobile router. Similarly, if the packet is transmitted in the opposite direction, a common secondary tunnel could be used for the transmission from the home agent of the first mobile router to the home agent of the second mobile router for packets that the home agent of the second mobile router transfers through either of the primary tunnels to the second mobile router.

In the third alternative, the packet is encrypted by the first mobile router. In this case, a secondary tunnel have to be set up for each external access, from the first mobile router over the external access of the second mobile router via the home agent of the second mobile router to the home agent of the first mobile router. The first mobile router transmits 509 the packet to the second mobile router through the secondary tunnel. In the second mobile router, a secondary tunnel care-of address is analyzed 510 for the second mobile router to detect 511, via the secondary tunnel care-of address, over which of its accesses the packet shall be routed. Thereafter, the data packet is transmitted over the selected external access via the home agent of the second mobile router to the home agent of the first mobile router. The second and third alternatives are described more thoroughly in the following. For example, in the third alternative there is described how the second mobile router can derive which external access that belongs to each secondary tunnel care-of address.

Figure 6:
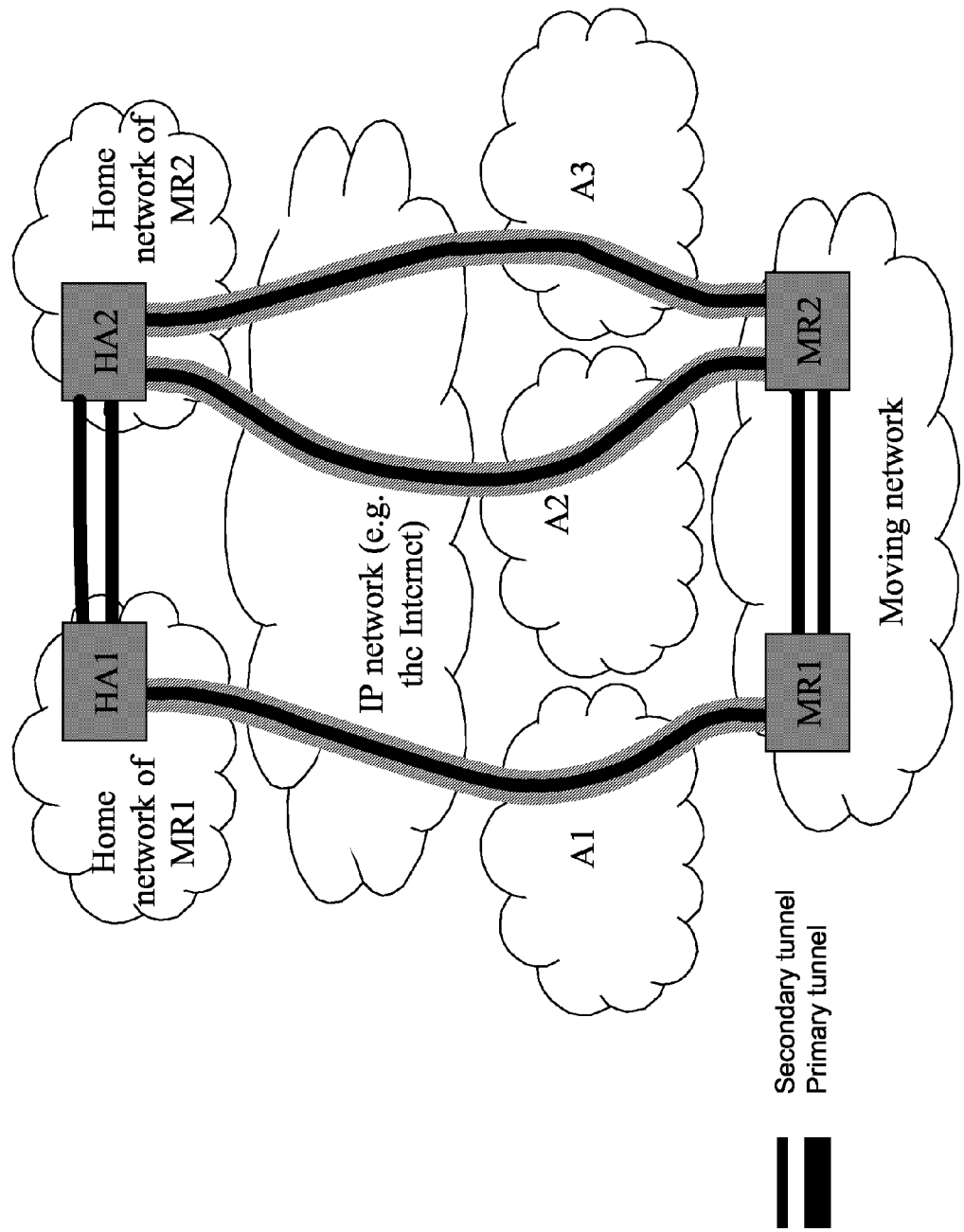
FIG. 6 illustrates a schematic block diagram of a first alternative of the first embodiment of the invention.
Figure 7:
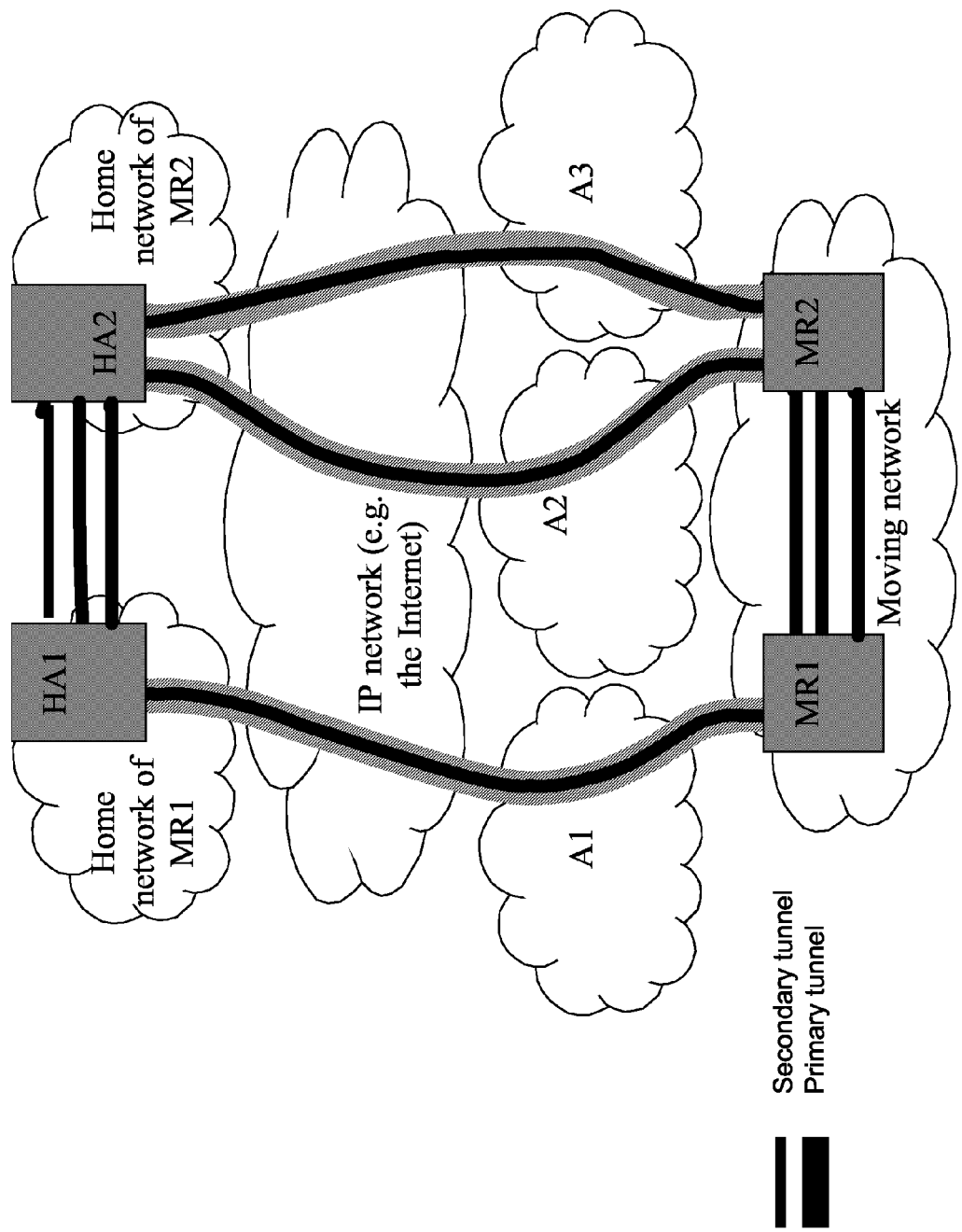
FIG. 7 illustrates a schematic block diagram of a second alternative of the first embodiment of the invention.

Below, in connection with FIGS. 6 and 7, is described the option when a mobile router has more than one external access. Assume that mobile router 1, MR1, has one access type (access A1) and mobile router 2, MR2, has two access types (access A2 and access A3). The accesses do not have to be of different types. Alternatively, they may also be of the same type. MR1 and MR2 use different address prefixes and different HAs (HA1 and HA2 respectively). The problem and the solution are described from the point of view of MR1 delivering a packet. In order to cover all access types, MR1 has to be able to tunnel packets through MR2 via each of MR2's access types, A2 and A3, in addition to the tunnel over its own access, A1. A problem here is that MR2 normally would forward packets over A2 or A3 based on matching the properties of the outer packet with its policies. MR1 on the other hand, when sending a packet through a tunnel via MR2, wants the inner packet of the tunnel to be the one to base the access selection on.

No Encryption of Secondary Tunnels

In the following, and in connection with FIG. 6, the secondary tunnels are not encrypted. Encrypting the MR-HA tunnel is optional in MIPv6 as well as in the NEMO Basic Support protocol. To encrypt a secondary tunnel is equivalent to encrypting a packet sent through a secondary tunnel.

In most cases it may be assumed that the MR-HA tunnel need not be encrypted. Integrity protection is, however, preferable for both the MR and the HA in order to assure that tunnel packets arrive from the correct remote tunnel endpoint. When encryption of the MR-HA tunnel is not required, the solution may be rather straightforward:

State that an MR should not encrypt a tunnel that goes via another MR.

When an MR discovers an outgoing packet, received from another MR, constituting (a part of) an unencrypted IP-in-IP tunnel (i.e. secondary tunnel), the MR (MR2) bases its access selection on the inner packet, i.e. the original packet sent from an MNN. This is determined on a packet by packet basis and thus the solution does not add any state in the MR. (If the MR can distinguish MR-HA tunnels from other IP-in-IP tunnels, the MR may restrict the application of this rule to the IP-in-IP tunnels that are actually MR-HA tunnels. A way for the MR to distinguish MR-HA tunnels from other IP-in-IP tunnels would be to learn the tunnel endpoints used for the MR-HA tunnels by other MRs in the moving network, i.e. the care-of-addresses and/or home agent addresses that the other MRs use for their MR-HA tunnels. The MR would then identify a MR-HA tunnel as an IP-in-IP tunnel, where the source address of an outbound outer packet matches the learnt care-of-address or the destination address matches the learnt home agent address of one of the other MRs in the moving network.)

This solution makes the tunnelled packets be flow managed as if they were not tunnelled which is more or less ideal. With this solution, MR1 can send a Binding Update (BU) message that establishes the tunnel over any access. It does not have to be sent via MR2, although there may be an advantage in doing so, when this solution coexists with the other one described in the following subsection. As seen in FIG. 6, there is one common path or tunnel from MR1 to MR2, which divides into two secondary tunnels via each of the two primary tunnels between MR2 and HA2, and then only one common path or tunnel from HA2 to HA 1. In this figure, the secondary tunnels are shown as black lines, and the primary tunnels are shown as grey lines, thicker than the black lines.

Encryption of Secondary Tunnels

In the following, and in connection with FIG. 7, the secondary tunnels are encrypted. The assumption above is used, i.e. that mobile router 1, MR1, has one access type (access A1) and mobile router 2, MR2, has two access types (access A2 and access A3), that MR1 and MR2 use different address prefixes and different HAs (HA1 and HA2 respectively), and that MR1 is delivering a packet. In this case the MR1 must establish one secondary tunnel over A2 and one secondary tunnel over A3 in addition to the primary tunnel over its own access A1. The problem is then how MR1 can control which access MR2 sends the tunneled packets over.

The MRs announce their presence and their respective accesses to each other. This is an on-going process in a moving network, which for example may be related to a flow management synchronization procedure, or using a separate protocol. Regular IPv6 router advertisements also announce the presence of a router and the prefix(es) it is using, but they do not indicate that the router is a mobile router (which however may be assumed in a moving network) and they do not announce the router's access(es). When discovering another MR, an MR should find out the link-layer address (e.g. Ethernet MAC address) that the other MR is using in the moving network. This can be extracted from the non-prefix part, i.e. an interface identifier, of the source address of the message that announced the presence of the other MR. An alternative way is to send a Neighbor Solicitation message with said source address as the target address and retrieve the link-layer address from the Neighbor Advertisement received in response. Yet a way would be to let the announcing MR include its link-layer address or home address in the announcement message. In an IPv6 router advertisement message the link-layer address is already included in the Source link-layer address option (although the router may omit it in certain circumstances).

When announcing the accesses that are in use at a MR, the MR will include the accesses in a list (of some form) in a message. In one embodiment, the order that these accesses appear in the message is used to control which external access MR2 sends the packet over. Let's assume that MR2 announces its accesses in the order A2, A3. MR1 now knows that it has to establish two secondary tunnels via MR2. MR1 then builds two addresses with the prefix of MR2 (unless it had already built one in which case it builds just one additional address): for example, one address is built in the regular way of building addresses in mobile IPv6: prefix+interface ID, denoted MR1pref2addr1, and the other address is built of prefix+<random pseudo interface ID>, denoted MR1pref2addr2. Of course MR1 verifies the uniqueness of the addresses through e.g. Duplicate Address Detection (DAD). MR1 then starts to establish the first secondary tunnel by sending a Binding Update (BU), using the MR1pref2addr1 as the source address, to its HA (i.e. HA1) via MR2. But MR1 also uses an Alternate Care-of Address mobility option in the mobility header. In this first tunnel establishment via MR2, MR1 inserts MR1pref2addr1 in the Alternate Care-of Address option.

When MR2 receives the BU it recognizes that it is a BU. It then checks the link-layer address that is associated with the source address of the BU, or the home address of the MR, if the MR has explicitly announced its home address, in order to find out whether the sender of the BU is a MR or a MNN (remember that a MR stores the link-layer addresses of the other MRs in the moving network). If the sought link-layer address is not in MR2's neighbor cache, MR2 retrieves it via a Neighbor Solicitation/Neighbor Advertisement exchange. When MR2 discovers that the BU was actually sent by another MR (i.e. because the link-layer address matched one of the previously stored MR link-layer address(es)), it records the properties of the BU in terms of the destination address (i.e. the HA1 address), the source address and the care-of address (extracted from the Alternate Care-of Address option). It determines that this is the first BU that it has received from this particular source address and thus associates this BU with the access that appeared first in its access announcement, i.e. A2. MR2 forwards the BU over any of its accesses (although it is possible that it may be advantageous to forward it over the access with which it has been associated).

When the Binding Acknowledgement (BA) subsequently arrives from HA1, MR2 notes that the tunnel is successfully established. MR2 now establishes a special state (henceforth referred to as "foreign tunnel state") for packets with the recorded care-of address as the source address and the HA1 address (HA1addr) as the destination address. The foreign tunnel state also includes the source address of the BU (which is also the destination address of the BA) that was used when the concerned tunnel was established. Since this is the first foreign tunnel state to be established in MR2 with this source address, MR2 associates this foreign tunnel state with the access that appeared first in the announcement of the accesses, i.e. A2. MR2 now knows that any packet received from MR1pref2Addr1 with HA1addr as the destination should be forwarded over access A2.

Subsequently, MR2 will monitor the NEMO signaling between MR1 and HA1 pertaining to this foreign tunnel state. If this signaling would indicate that the tunnel is removed, or that its lifetime is changed, MR2 will treat its foreign tunnel state accordingly (i.e. remove it or change its lifetime). If A2 would become unavailable and a packet matching the foreign tunnel state is received (before MR1 has reacted to MR2's announcements of the changed access availability), MR2 will try to inspect the inner packet to make its own flow management choice, but assuming that the inner packet is encrypted, the MR will treat the packet as its policies stipulate for encrypted packets, e.g. use a load balancing algorithm or an arbitrary choice of access. In this example, however, the choice is trivial, since there is only one access left, namely A3. MR1 then proceeds to establish the second tunnel via MR2. It does this by sending a BU with the same source address as the BU for the first tunnel, i.e. MR1pref2addr1, but this time with its other address, MR1pref2addr2, indicated in the Alternate Care-of Address mobility option.

When MR2 receives this second BU, it goes through the same procedure as described above for the first tunnel establishment. A difference, however, is that this time MR2 discovers that it already has a (one) foreign state with this source address. Hence, it associates the foreign tunnel state resulting from this second BU/BA exchange with the access that appeared second in the message that announced the accesses, i.e. A3.

A special case in conjunction with foreign tunnel state creation (and its association with an access) is illustrated as follows: Assume that MR2 has three accesses (A2, A3 and A4, announced in that order) and MR1 has one tunnel associated with each of these accesses. Then the tunnel associated with A3 for some reason is removed and so is the corresponding foreign tunnel state in MR2. MR1 wants to replace the removed tunnel with a new tunnel, so it sends a BU via MR2. MR2 determines that it already has two foreign tunnel states with this source address. If the basic rules described previously are to be followed, MR2 should now associate this BU (and the subsequently established foreign tunnel state) with the access that appeared third in the access announcements, i.e. A4. But there already is a foreign tunnel state with this source address associated with A4. So the basic rule has to be modified in order to cover also this special case. A better rule, although trickier to express, is:

"A new foreign tunnel state should be associated with the access that appeared the earliest in the access announcement out of the accesses that yet do not have any associated foreign tunnel state with that source address. If all accesses already have associated foreign tunnel states with this source address, no new foreign tunnel state is created."

To reduce the risk of loss of tunnel-access association synchronization between MR1 and MR2 (i.e. that MR1 and MR2 has different views on which access a particular tunnel is associated with) MR2 should consistently use the principle that the relative order of the accesses in the announced list is not affected by changes in the available accesses. That is, when a new access is added to the list, it should be added at the end and when an access is removed from the list the relative order of the remaining accesses in the list should not be affected.

In the following, an alternative is described to the above described principle how to associate secondary tunnel addresses to external accesses when the secondary tunnels are encrypted. With this alternative principle, a tunnel-access association is not fixed—it may change if the available accesses change. Instead, the following rule governs which access a particular tunnel is associated with:

"Of the tunnels from a certain MR (MR1) (or more precisely: of the tunnels established using a certain source address) via another MR (MR2), the one with the lowest care-of address is associated with the one of MR2's available accesses that appeared first in the latest announced list of available accesses from MR2. The tunnel with the second lowest care-of address is associated with the access that appeared second in the latest announced list and so forth. That is, the care-of addresses, ordered by size (when seen as binary numbers), mapped on the latest announced list of available accesses determines the tunnel-access association."

Apparently, this principle makes the tunnel-access association management dynamic and MR2 will, if needed, change the foreign tunnel state associations, when the available accesses change. Likewise, MR1 will, if needed, change its tunnel-access associations pertaining to tunnels via MR2, when MR2 announces a changed access list.

The above mentioned encrypted and unencrypted embodiments may easily coexist in the same moving network and in the same MRs. In the example above, this coexistence would have a significant impact only on MR2. A foreign tunnel is defined as a secondary tunnel that another MR, in this case MR1, has established through this mobile router, i.e. MR2. For this reason, the MR2 must keep a state for this foreign tunnel, called a foreign tunnel state. The state would make it possible for the MR to remember e.g. Binding Updates and Binding Acknowledgements passing for this tunnel and to map data packets received through the tunnel to the right external access. In a coexistence scenario, MR2 would act as follows when receiving an outbound packet that matches a foreign tunnel state:

MR2 first checks whether the inner packet is encrypted. If it is not encrypted, MR2 treats the packet (including access selection) according to its regular flow management policies, but based on the inner packet.

If the inner packet is encrypted, MR2 forwards the packet over the access that is associated with the matching foreign tunnel state.

With this coexistence solution, it is preferable that a MR using the unencrypted embodiment sends the BU via the other MR that the resulting tunnel should traverse. That way also the tunnels established with the unencrypted embodiment in mind will trigger a foreign tunnel state in another MR. As a result the other MR will only have to give special treatment to those IP-in-IP tunnels, i.e. secondary tunnels that are actually MR-HA tunnels—all other IP-in-IP tunnels can be handled according to the regular flow management policies.

An alternative would be to mandate that a MR using the unencrypted embodiment does not send the BU via the MR that the resulting tunnel should traverse, but instead over one of its own accesses. This would avoid creation of foreign tunnel states for MR-HA tunnels that will anyway not be encrypted. This would allow another (intermediate) MR receiving outbound packets to use the encrypted and unencrypted embodiment exactly as described for each respective embodiment. If an outbound packet matches a foreign tunnel state, the MR forwards it over the access that is associated with the foreign tunnel state (this is the encrypted embodiment in its "pure" form)—no additional rules. If an outbound IP-in-IP packet is received (not matching any foreign tunnel state) the packet is flow managed based on the inner packet (i.e. the unencrypted embodiment in its "pure" form).

Address Translation

Below is described the second embodiment, which uses network address translation functions, e.g. Network Address Translators (NAT) for translating the source addresses to avoid ingress filtering. As mentioned, an ingress filtering function may be situated in any node in the network. According to this embodiment, address translation will be accomplished before the first node performing ingress filtering in the upstream direction, i.e. in the direction from the moving network towards the Internet. Thereby, the MNN can pick any source address, and a node comprising an address translation function would rewrite the source address to match a topologically correct prefix of the selected external access.

According to one alternative of the second embodiment, a NAT can be placed in either a HA or somewhere in the Internet. It is assumed that when the MNN selects a source address it implicitly also selects what HA to use. If the NAT is placed in a Home Agent, the solution is limited because external access cannot be selected arbitrarily as only the external accesses that are used for tunnels to the chosen HA (which is determined by the selection of source address) can be used for selection. The HA can set a bit (not defined yet) in its Binding Acknowledgement to indicate to the MR that it can perform address rewrite so that the MR knows that it can send packets with topologically incorrect source addresses to it.

According to another alternative, the NAT may be placed in the MRs, i.e. one NAT function in each MR. When an outgoing packet arrives at an MR, and the MR has an address with the same address prefix as the source address prefix of the packet, the MR selects an external access. The MR then checks whether the packet's source address topologically matches the address of the MR of the selected access. If it does, the MR forwards the packet to the MR of the selected access, which in turn forwards it through one of its tunnels, or the MR sends it through one of its own tunnels, if the selected access is one of its own. If the source address does not topologically match the MR of the selected access, then the MR uses its NAT function to replace the source address with an address with the prefix of the MR of the selected access, which may be another MR or the MR itself. It then forwards the packet to the MR of the selected access, which in turn forwards it through one of its tunnels, or sends it through one of its own tunnels, if the selected access is one of its own. To support this NAT function each MR must build an address for each prefix announced in the moving network. An alternative of using NAT functions in the MRs, is to always use the NAT in the outgoing MR, i.e. the MR that is responsible for the selected access. An MR receiving an outbound packet would always forward it to the selected outgoing MR, unless it happens to be the selected outgoing MR itself, without modifying the source address. The selected outgoing MR would then apply the NAT and translate the source address (if needed) before forwarding the packet over the selected access. This variant does not require an MR to build an address for each MNP advertised in the moving network, it is enough to build address(es) for its own MNP(s).

If the selected access would change in the alternatives just presented (e.g. due to change of access availability or change of policies), the ongoing sessions between MNNs and their peers on the Internet will break. The reason is that the sessions will have a different source address from the moving network and the peers will not be able to handle that. Note that the MNNs will not change address, but their NAT or the translated address will change.

Figure 8:
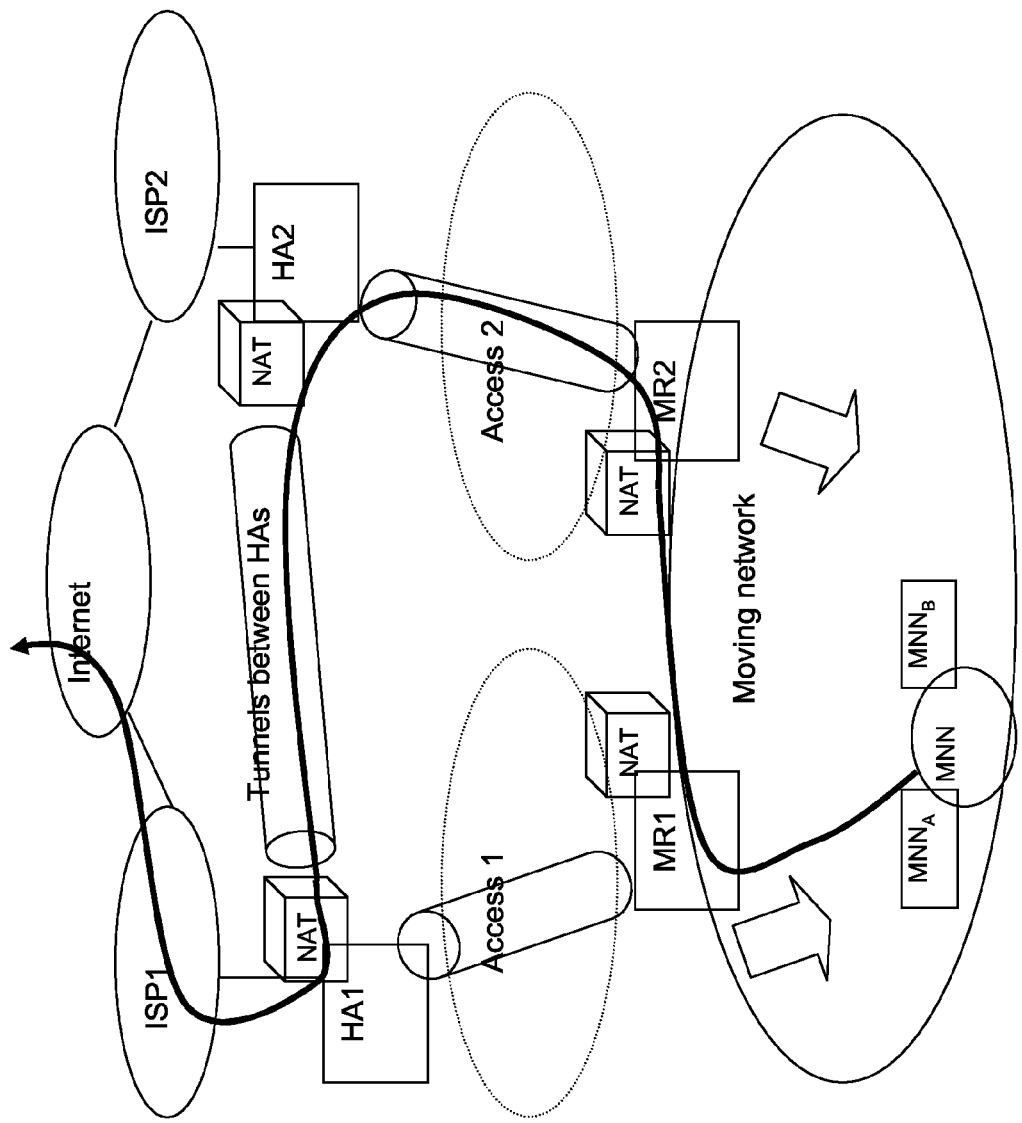
FIG. 8 shows a schematic block diagram of a first alternative of a second embodiment of the invention.

A first solution to this is to have a NAT function in each HA and in each MR so that the packets traverse two NATs between the MNN and its peer. This solution is shown in FIG. 8, in which there are two mobile routers, MR1, MR2, each having one access, Access1, Access2. In the figure, NATs are placed in each mobile router and in each home agent, HA1, HA2, to the corresponding MR. The thick line shows the way an exemplary packet is sent through the communication system, which packet is associated with the source address $MNN_A$ and to which the external access, Access2, of the second mobile router, MR2, has been selected. The large arrows illustrate that the MRs advertise their MNPs to the MNN. MR1 selects Access2 as external access. Preferably, the NAT in MR1 will make a first address translation to an address corresponding to the address prefix of MR2. Although, the first address translation may be accomplished in any of the two MRs or the second home agent, HA2, although, if it is not known in which nodes ingress filtering is to take place, it would be preferable to have the first address translation made in MR1. The NAT in the HA that will send the packet through the Internet, HA1 in FIG. 8, will restore the original address (the address of the MNN), i.e. translate the address back to the original address. When an MR or HA performs the first address translation they will also add an address option to the packet. This address option contains the address of the MNN. When the packet reaches the NAT that is to restore the address, it will be restored to its original form thanks to the information available in this address option. This solution requires that there is a way to route packets between the HAs for outbound packets. The translation will be accomplished in the HA, HA1, that belongs to the original source address of the packet, while the packet will reach the HA, HA2, that is the end-point of the tunnel over the selected access that was used from the moving network. A mesh of tunnels between home agents can be used for this. The routing into the tunnels will be based on the address option rather than the destination address. The benefit from this approach is that the packet will be restored, so that it does not cause the session to break if the access changes, and that the packet will traverse the topologically correct HA corresponding to the address of the MNN. The solution is in other words transparent to the MNN and the CN. This solution handles the generic case where there is an assumption that there may be an ingress filtering router somewhere on the path (e.g. an MR or an HA in this case) and for that reason the packet has to be rewritten. If that assumption is false, i.e. there is no ingress filtering router on the path, then a simpler solution is to avoid the two NATs altogether. The mesh of tunnels between HAs is needed, though.

Figure 9:
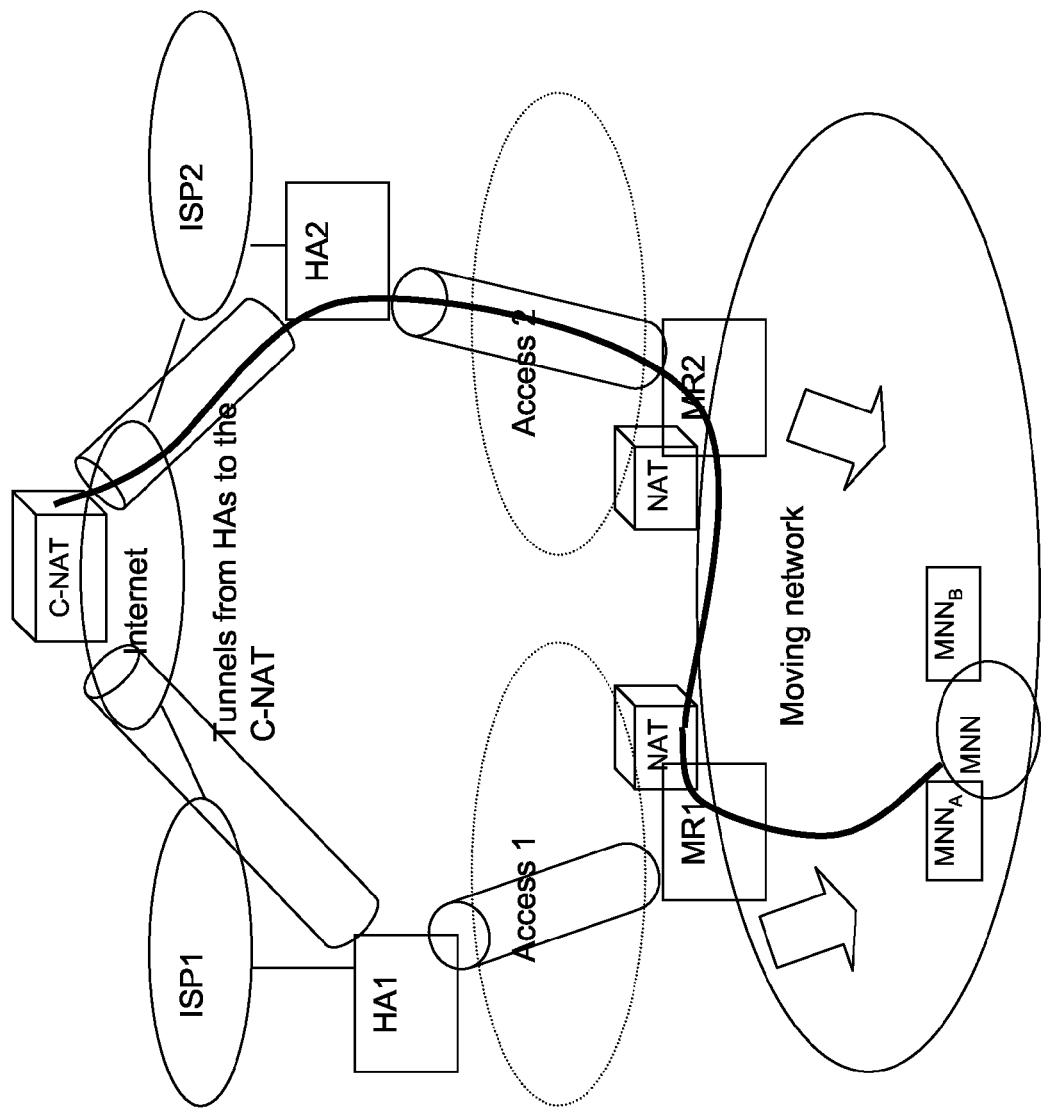
FIG. 9 illustrates a schematic block diagram of a second alternative of the second embodiment of the invention.

A second solution is to introduce a number of Home Agent independent NATs somewhere centrally on the Internet. This is shown in FIG. 9, which shows the same exemplary scenario as in FIG. 8, i.e. where a packet having a first address, $MNN_A$, is to be sent over an access of the second MR, MR2. In FIG. 9, the address is translated in the NAT of MR1 and then translated back to the original address in a centrally placed NAT, C-NAT. All HAs will establish any cast uni-directional tunnels to such central NATs for outbound traffic that has been address translated by an MR. When an MR creates an address below another MR's prefix to be used for address-rewriting, it will, according to one embodiment of the solution, create a special form of address. The lower e.g. 64 bits will comprise: some format bits in a unique combination indicating C-NAT addressing; some bits indicating an anycast address of the central NAT; and finally some bits for generating a unique address in case there are multiple MRs building an address from this prefix. When an outbound packet reaches the HA2 in FIG. 9, after decapsulation, the HA2 will inspect the source address of it. If this address has a lower 64 bits containing special format indicating C-NAT addressing, the HA2 will take the anycast bits and expand them to a full anycast address. The packet will then be tunneled to this anycast address. When the packet reaches the central NAT at the anycast address, the source address will be rewritten again to the public address of the central NAT. By this method, if all MRs in a moving network use the same central NAT, to the CN, the MNNs will always have a stable address, independent of access changes. Another benefit from this method is that HAs do not have to be coordinated.

Figure 10:
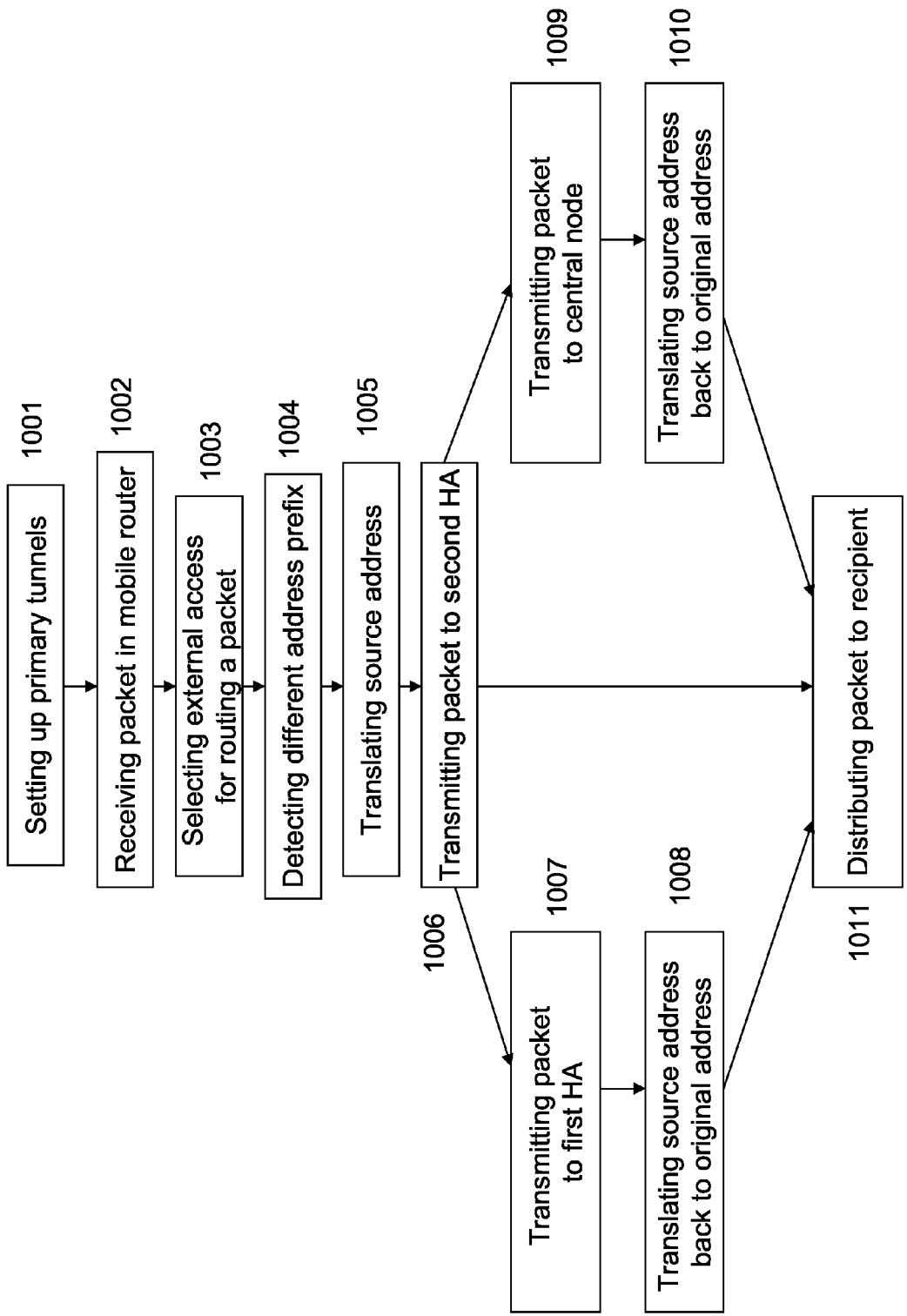
FIG. 10 shows a flow chart according to the second embodiment of the invention.

FIG. 10 shows a flow chart according to a method of the second embodiment of the invention for an exemplary embodiment with two different mobile routers, a first and a second mobile router, advertising different address prefixes. The method starts by setting up 1001 a primary tunnel over each external access available from the moving network to a home network, from the mobile router that has the ability to access the external access to the home agent of that mobile router. A data packet originating from a mobile network node in the moving network and destined to an address external of the moving network is received 1002 at a mobile router using the same address prefix as the address prefix of the source address of the packet, in this example the first mobile router. The first mobile router receives the packet either from a mobile network node directly, or, if the source address prefix of the packet was different to the address prefix of the mobile router first receiving the packet, from the mobile router first receiving the packet. Then, when a packet is to be routed to an external address, an external access is selected 1003 by the moving network, e.g. by the first mobile router, based on e.g. access selection policies. Further down in this document, an embodiment is described how this external access selection can be accomplished. Thereafter, it is detected 1004 that the source address of the packet has a different address prefix than the address of the mobile router that has access to the selected external access, e.g. the second mobile router. Then the source address of the data packet is translated 1005 to an alternative source address having the address prefix of the second mobile router, and the data packet is transmitted 1006 via the selected external access to the home agent of the second mobile router, called the second home agent. Thereby, the packet could be delivered to a home network without being filtered out due to the wrong address prefix in any intermediate node. The step of translating 1005 may be accomplished in any of the first or the second mobile router, as long as ingress filtering is not performed before the address is translated. The receiving home agent can then distribute 1011 the packet to the recipient of the packet.

Alternatively, to cater for the case where the selected access would change during an ongoing session, e.g. due to change of access availability or change of policies, the method may proceed according to two alternatives described below. According to the first alternative, the second home agent would transmit 1007 the data packet to the home agent of the first mobile router (first home agent) in a tunnel set up between the two home agents, and the first home agent would translate 1008 the alternative source address back to the original source address with the original address prefix, before the packet is distributed 1011 to the recipient of the packet. According to the second alternative, the second home agent would transmit 1009 the data packet to a central node on e.g. the Internet with the ability to translate addresses associated with data packets. The packet would be transmitted through a tunnel set up between the second home agent and the central node. Then, the central node would translate 1010 the alternative source address back to the original source address with the original address prefix, before the packet is distributed 1011 to the recipient of the packet.

The two embodiments described, i.e. the secondary tunnel embodiment and the address translation embodiment, have the vision in common that the access selection and tunneling to the Home Agents should be completely transparent to the MNN and its CN. If the MNN selects $MNN_A$ as its source address, the packet should enter the Internet through ISP1. This can be achieved both with tunnels or NATs. Tunneling and/or forwarding between the MRs and the HAs is used to deliver the packets to the correct HA over the selected access. The NAT functionality can be seen as a tunnel-reduction mechanism. The meshed tunnel option contains state per packet, while the NAT option contains state in the nodes in the network instead.

Figure 11:
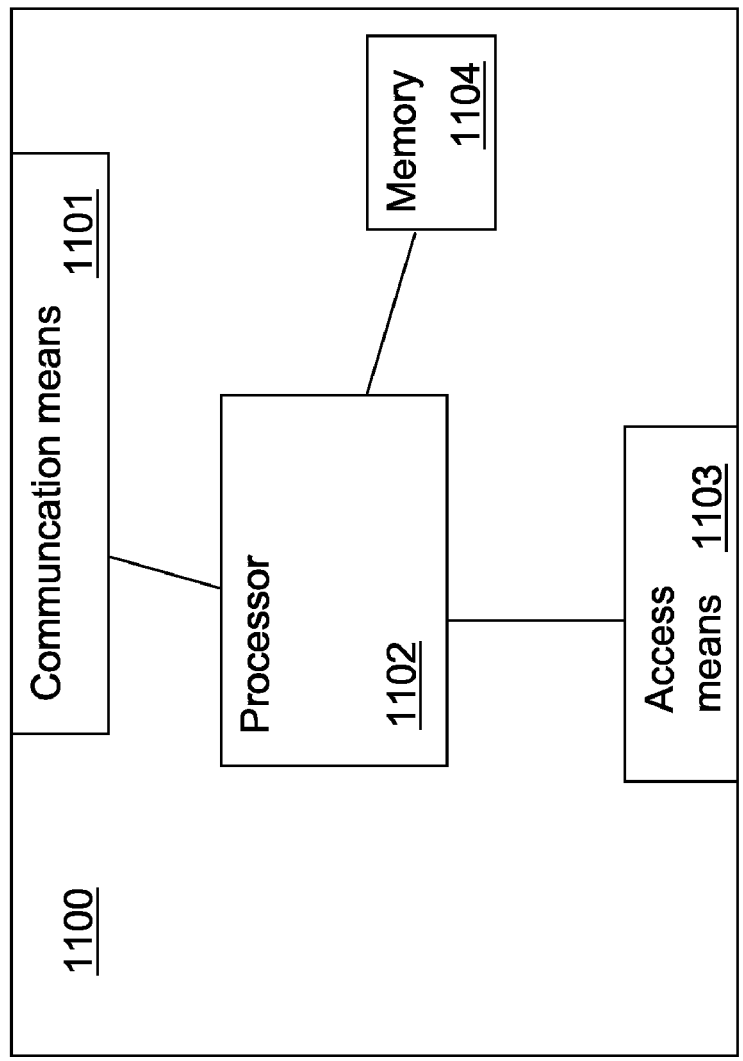
FIG. 11 shows a schematic block diagram of a mobile router according to the invention.

FIG. 11 shows a mobile router 1100 according to an embodiment of the present invention. The mobile router comprises:
An internal communication means 1101, arranged for receiving data packets and information from MNNs and other MRs in the moving network and for sending packets and information to MNNs and other MRs in the network;
A processor 1102 arranged for:
selecting external access for routing data packets based on information in the data packets and other information relevant for external access selection;
detecting that a source address associated with a data packet has an address prefix that is different to the address prefix of the mobile router used for accessing the selected external access;
providing a data packet with an different source address used for routing the packet to the home agent of the second mobile router, which alternative source address has the second address prefix;
and
An access means 1103 arranged for accessing at least one first external access, over which at least one first external access one primary tunnel each is set up to a home agent of the mobile router, and for transmitting a data packet over the at least one first external access means.

According to the first embodiment of the invention, the processor 1102 may further be arranged for:
setting up secondary tunnels over each of the external accesses accessible from a second mobile router, from the mobile router via the second mobile router, the external access accessible from the second mobile router and the home agent of the second mobile router to the home agent of the mobile router;
and wherein the processor 1102 is arranged for providing a data packet with a different source address by being arranged for adding an address related to the mobile router but having the second address prefix to the data packet.

According to the second embodiment of the invention, the processor 1102 may further be arranged for:
translating the source address associated with the data packet to an address having the second address prefix. For this reason the mobile router may be equipped with a Network Address Translator (NAT) function.

The mobile router may also be equipped with a memory 1104 for storing information about external accesses in the network and information influencing the selection of external access, such as access selection policies and flow states regarding access selections for previously routed packets.

Below is described an embodiment for selecting external access over which a data packet is to be routed to a home agent, which embodiment may be used in the invention. For achieving the best use of the external accesses in the moving network, the mobile routers in the network have information about each other's external accesses; each mobile router has information regarding e.g. which external accesses the other mobile routers in the moving network have, which capacity the external accesses have, the momentary status of the external accesses etc. This information has been transmitted from and received by all MRs of a moving network. When required, for example when a type of information has changed, this information is exchanged between all the MRs such that all MRs have the same information regarding the external accesses in the moving network, i.e. the information regarding the external accesses in the moving network is synchronized among the mobile routers in the moving network. A synchronization may also take place on a periodical basis. When a data packet originating from an MNN is received in a mobile router having the same address prefix as the source address prefix of the packet, the mobile router will select one of the external accesses in the network based on flow management policies which have been synchronized among the mobile routers. These policies may state that e.g. the information about the external accesses and information in the data packet should be used for making access selection decisions. When required, the selection is also based on configuration and access selection policies in the MRs, which policies are also synchronized between the MRs. Since the external access information and the policies are synchronized, all MRs will make the same routing decision and, consequently, select the same external access for a packet. The information in the data packet that is used for the selection may for example be a flow identification (i.e. which data flow a data packet belongs to), such as source and destination IP address plus one of:
  source and destination port number plus protocol number, flow label, or
  Security Parameter Index (SPI) and protocol number, which in this case will indicate a security protocol such as Encapsulating Security Payload (ESP) or Authentication Header (AH).

The step of selecting external access also comprises reading the information in the data packet to detect whether the data packet belongs to an already recorded flow. For this reason, the MR has recorded and stored a state of any previous packet of the same flow (se below), the state comprising routing decision and flow ID. This detection takes place by e.g. comparing the flow ID of the data packet to flow IDs stored in a database in the mobile router. If the data packet belongs to an already recorded flow, the selection will be done according to a routing decision made for a previous packet of the already recorded flow. For this reason, the access selection for the previous packet was recorded and stored in the mobile router as a flow state comprising flow identification and routing decision.

If the packet belongs to a previously not recorded flow, the MR will, in addition to using external access information, select access based on access selection policies configured in the MRs. Such policies may, for example, have been pre-configured by the MR operator or the MNN user, such as subscription profiles, access classifications and selection principles. Other policies will change dynamically, such as load-sharing algorithms etc. An access selection policy may also be of the type:
  To aggregate the throughput of the different accesses to improve the access throughput experienced by the MNNs.
  To apply load-sharing policies to make the most efficient use of the available access resources (e.g. to maximize the end-user experience).
  To differentiate MNNs e.g. based on subscription profiles.
  To differentiate flows e.g. based on application.
  To provide redundancy, e.g. using one of the available accesses as a backup that is activated only when the other access/accesses is/are broken.

For all MRs to make the same decision given the same input, the access selection policies are also synchronized between the MRs, when required, for example when a policy has changed.

As mentioned above, for a packet belonging to a previously unidentified flow, the MR will create and store a state for the flow, which state comprises the routing decision and a flow identification. According to an alternative embodiment of the invention, the flow state can also be transmitted to other mobile routers such that the flow state is synchronized between the MRs. Thereby, it will be assured that the MRs will make the same routing decision even if packets are received at different MRs.

In the embodiment for selecting external access, according to one alternative solution, the Home Agent will perform an identical flow classification as the MRs, when receiving tunnelled packets from an MR. The Home Agent will create a state for this flow and also store a reference to the tunnel over which this packet was received. When packets routed in the opposite direction are received by the HA, the HA will attempt to classify the flow. If a packet is found to belong to a previously known flow, the HA will forward it over the same tunnel as was recorded in the state of the flow. If the flow is unidentifiable, the HA will not take any decisions but simply forward it over the primary tunnel or a default tunnel towards the MR. The HA will not create any state for such an unidentifiable flow, but instead wait for the MR's decision, which will be indicated in the form of a packet belonging to the same flow in the opposite direction. This packet may arrive through the same tunnel as the HA chose or through another tunnel, i.e. the tunnel selection is entirely up to the MR, and the HA will follow this decision. This mechanism will make the MR make all forwarding decisions for all flows to and from the MNNs. The HA will simply follow the MR's decisions and make sure the return traffic is forwarded via the same tunnel (and thus the same access). An MR may also explicitly instruct the HA what tunnel to use for the downlink part of a flow. This allows a flow to use asymmetric links for the uplink and the downlink parts.

As an alternative to the embodiments of the invention described above for being able to use any of the external accesses accessible from any of the MRs for routing data, even though the mobile routers are unsynchronized with regard to access prefix, is to notify the MNN that it has made a non-preferred source address selection. This notification would be sent if the address of the MR that has access to the selected external access has a different address prefix than the source address of the packet sent form the MNN. With this approach it is actually possible for the moving network (e.g. the MRs) to control the previously discussed arbitrary source address selection problem. If the MNN happens to select a source address that doesn't match the external access selection, one of the MRs, e.g. the default router that MNN uses, can send a notification to tell the MNN to use another source address. The drawback with this alternative is that new functionality would be necessary to incorporate into the MNNs, for the MNNs to know how to handle such a notification. Another drawback is that if external access for some reason has to be change during a session, the session will be dropped.

According to above embodiments, when a receiving MR receiving an outgoing packet from an MNN has an address with a different address prefix than the source address of the packet, the packet will be forwarded to a selecting MR with the same address prefix as the source address of the packet, and an external access selection will be accomplished in MR with the same address prefix. To avoid such redirection loops, it is suggested, according to an alternative embodiment of the invention, that the receiving MR sends a redirect message back to the MNN to instruct the MNN that for subsequent transmission of packets to the particular destination, the MNN should use a next hop towards the selecting MR. The next hop is the link-local IPv6 address of the selecting MR. This will reduce the number of hops by one as subsequent packets will be sent directly to the selecting MR and not via the receiving MR. The redirect message may be an Internet Control Message Protocol (ICMPv6) for the Internet Protocol Version 6 (IPv6) Redirect message, which is described in "Internet Control Message Protocol (ICMPv6) for the Internet Protocol Version 6 (IPv6)", by A. Conta et al., published on the Internet as RFC 2463 in December 1998.

The invention makes it possible for a data packet originating from a mobile network node in a moving network to be routed over any of a number of external accesses accessible from different mobile routers in the moving network, even though the mobile routers advertise different address prefixes to the mobile network nodes.

Also, a person skilled in the art would understand that the above described methods can also be used for routing packets in the other direction, i.e. from the network, e.g. the Internet, via a home network and a mobile router before it eventually ends up at a mobile network node in a moving network.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A method in a communication system for routing a data packet from a mobile router of a moving network to a home agent in a home network related to the moving network, said data packet originating from a moving network node in the moving network, wherein the moving network includes a first mobile router that accesses a first external access and a second mobile router that accesses a second external access, said method comprising the steps of:
    setting up by the first mobile router, a primary tunnel over the first external access to a home agent of the first mobile router;
    setting up by the second mobile router, a primary tunnel over the second external access to a home agent of the second mobile router;
    advertising by the first mobile router, a first address prefix;
    advertising by the second mobile router, a second address prefix;
    receiving the data packet by the first mobile router, said data packet having a source address having the first address prefix;
    selecting the second external access for routing the data packet to the home agent of the second mobile router, wherein the first mobile router and the second mobile router have information regarding the first external access and the second external access, and wherein the step of selecting is based on information in the data packet, on the information regarding the first and the second external accesses, and on access selection policies stored in the first mobile router and the second mobile router;
    detecting that the source address of the data packet has an address prefix different from the address prefix advertised by the second mobile router;
    providing the data packet with a different source address usable for routing the data packet to the home agent of the second mobile router, said different source address having the second address prefix;
    transmitting the data packet via the selected external access to the home agent of the second mobile router; and
    synchronizing the access selection policies and the information regarding the first external access and the second external access between the first mobile router and the second mobile router.

2. The method according to claim 1, wherein the step of transmitting the data packet includes:
    setting up a secondary tunnel from the first mobile router via the second mobile router, the second external access, and the home agent of the second mobile router to the home agent of the first mobile router;
    wherein the step of providing the data packet with a different source address comprises adding to the data packet, an address related to the first mobile router, said address related to the first mobile router having the second address prefix;
    wherein the step of transmitting the data packet to the home agent of the second mobile router comprises transmitting the data packet through the secondary tunnel to the home agent of the second mobile router; and
    wherein the method further comprises the step of transmitting the data packet through the secondary tunnel from the home agent of the second mobile router to the home agent of the first mobile router.

3. The method according to claim 2, further comprising determining by the second mobile router, whether the data packet is encrypted by the first mobile router.

4. The method according to claim 2, wherein the second mobile router also accesses a third external access, and the step of selecting includes selecting the second external access by the second mobile router after receiving the data packet from the first mobile router through the secondary tunnel, wherein the secondary tunnel uses the primary tunnel set up over the second external access.

5. A method in a communication system for routing a data packet from a mobile router of a moving network to a home agent in a home network related to the moving network, said data packet originating from a moving network node in the moving network, wherein the moving network includes a first mobile router that accesses a first external access and a second mobile router that accesses a second external access, said method comprising the steps of:
    setting up by the first mobile router, a primary tunnel over the first external access to a home agent of the first mobile router;
    setting up by the second mobile router, a primary tunnel over the second external access to a home agent of the second mobile router;
    advertising by the first mobile router, a first address prefix;
    advertising by the second mobile router, a second address prefix;
    receiving the data packet by the first mobile router, said data packet having a source address having the first address prefix;
    selecting the second external access for routing the data packet to the home agent of the second mobile router;
    detecting that the source address of the data packet has an address prefix different from the address prefix advertised by the second mobile router;
    providing the data packet with a different source address usable for routing the data packet to the home agent of the second mobile router, said different source address having the second address prefix, wherein an address related to the first mobile router and having the second address prefix is added to the data packet; and
    transmitting the data packet via the selected external access to the home agent of the second mobile router, wherein a secondary tunnel is set up from the first mobile router via the second mobile router, the second external access, and the home agent of the second mobile router to the home agent of the first mobile router, wherein the data packet is transmitted through the secondary tunnel to the home agent of the first mobile router via the home agent of the second mobile router;
    wherein when the second mobile router also accesses a third external access, the step of selecting includes selecting the second external access for routing the data packet to a home agent, wherein the at least one secondary tunnel comprises a first secondary tunnel set up over the second external access and a second secondary tunnel set up over the third external access when the data packet is encrypted by the first mobile router, the first secondary tunnel having a first secondary tunnel care-of address set by the first mobile router and the second secondary tunnel having a second secondary tunnel care-of address set by the first mobile router, the step of transmitting comprising the steps of:

transmitting the data packet to the second mobile router through the first secondary tunnel;
analyzing the first secondary tunnel care-of address in the second mobile router;
detecting from the first secondary tunnel care-of address, that the data packet is to be transmitted through the second external access; and
transmitting the data packet via the home agent of the second mobile router to the home agent of the first mobile router through the first secondary tunnel.

6. The method according to claim 5, further comprising, before the step of providing the data packet with a different source address, the steps of:
sending data from the second mobile router to the first mobile router comprising information regarding the second and the third external accesses, wherein the second and the third external accesses appear in a certain order in the data;
setting up a secondary tunnel for each of the second and the third external accesses; and
associating each secondary tunnel with a unique one of the second and the third external accesses, the associations being set up such that the order in which the secondary tunnels are set up matches the order in which the second and the third external access appear in the data.

7. The method according to claim 5, further comprising, before the step of transmitting the data packet to the second mobile router, the steps of:
sending data from the second mobile router to the first mobile router comprising information regarding the second and third external accesses, wherein the second and the third external accesses appear in a certain order in the data;
setting up a secondary tunnel for each of the second and the third external accesses; and
associating each secondary tunnel with a unique one of the second and the third external accesses, the associations being set up such that the order of the secondary tunnel care-of-addresses matches the order in which the second and the third external accesses appear in the data, wherein the order of the secondary tunnel care-of-addresses refers to the order of the care-of-addresses' data representation interpreted as numbers.

8. The method according to claim 1, wherein the step of providing the data packet with a different source address comprises translating the source address of the data packet to a second source address having the second address prefix and wherein the translating is accomplished in one of the first mobile router and the second mobile router.

9. The method according to claim 8, further comprising the steps of:
transmitting the data packet from the home agent of the second mobile router to the home agent of the first mobile router; and
translating the second source address to the source address having the first address prefix.

10. The method according to claim 8, further comprising the steps of:
transmitting the data packet from the home agent of the second mobile router to a node on the Internet with the ability to translate addresses associated with data packets; and
translating the second source address to the source address having the first address prefix.

11. The method according to claim 1, wherein the step of selecting comprises the steps of:
reading the information in the data packet to detect whether the data packet belongs to an already recorded data flow;
if the data packet belongs to an already recorded data flow:
making a routing decision for the data packet according to a routing decision stored in a flow state for the already recorded data flow and according to the information regarding the first external access and the second external access, and
if the data packet belongs to a flow that has not been recorded:
making a routing decision for the data packet according to access selection policies and according to the information regarding the first external access and the second external access; and
recording a flow state for the flow that the data packet belongs to, said flow state comprising the routing decision and a flow identification.

12. A communication system for routing a data packet from a mobile router of a moving network to a home agent in a home network related to the moving network, said data packet originating from a moving network node in the moving network and said data packet having a source address having a first address prefix, said system comprising:
a first mobile router in the moving network configured to access a first external access and set up a primary tunnel to a home agent of the first mobile router, wherein the first mobile router advertises the first address prefix;
a second mobile router in the moving network configured to access a second external access and set up a primary tunnel to a home agent of the second mobile router, wherein the second mobile router advertises a second address prefix;
wherein the first mobile router, upon receiving the data packet, is configured to select the second external access for routing the data packet to the home agent of the second mobile router, wherein the first mobile router and the second mobile router have information regarding the first external access and the second external access, and wherein the step of selecting is based on information in the data packet, on the information regarding the first and the second external accesses, and on access selection policies stored in the first mobile router and the second mobile router;
wherein the first mobile router is configured to detect that the source address of the data packet has an address prefix different from the address prefix advertised by the second mobile router;
wherein the first mobile router is configured to provide the data packet with a different source address usable for routing the data packet to the home agent of the second mobile router, said different source address having the second address prefix;
wherein the first and second mobile routers are configured to transmit the data packet via the selected external access to the home agent of the second mobile router; and
wherein the first and second mobile routers are configured to synchronize the access selection policies and the information regarding the first external access and the second external access between the first mobile router and the second mobile router.

13. The communication system according to claim 12, wherein a secondary tunnel is set up from the first mobile router via the second mobile router, the second external access, and the home agent of the second mobile router to the home agent of the first mobile router, wherein:

when providing the data packet with a different source address, the first mobile router is configured to add to the data packet, an address related to the first mobile router, said address related to the first mobile router having the second address prefix;

wherein the first and second mobile routers are configured to transmit the packet to the home agent of the second mobile router through the secondary tunnel; and wherein the home agent of the second mobile router is configured to transmit the data packet through the secondary tunnel to the home agent of the first mobile router.

14. A first mobile router of a moving network in a communication system, the first mobile router for routing a data packet originating from a moving network node in the moving network to a home agent in a home network related to the moving network, wherein the first mobile router comprises:

means for accessing a first external access over which a primary tunnel is set up to a home agent of the first mobile router, and for transmitting a data packet over the first external access means;

communication means for receiving a data packet originating from a moving network node from the moving network;

wherein the communication means includes means for communicating with a second mobile router in the moving network, the second mobile router accessing a second external access over which a primary tunnel is set up to a home agent of the second mobile router;

wherein the first mobile router is associated with an address having a first address prefix, and the second mobile router is associated with an address having a second address prefix, wherein the received data packet originating from the moving network node has a source address having the first address prefix;

means for selecting the second external access, wherein the first mobile router has information regarding the first external access and the second external access, and wherein the step of selecting is based on information in the data packet, on the information regarding the first and the second external accesses, and on access selection policies stored in the first mobile router;

means for detecting that the source address of the data packet has an address prefix different from the address prefix of the second mobile router;

means for providing the data packet with a different source address usable for routing the data packet to the home agent of the second mobile router, said different source address having the second address prefix;

wherein the communication means transmits the data packet to the second mobile router; and wherein the first mobile router is configured to synchronize the access selection policies and the information regarding the first external access and the second external access with the second mobile router.

15. The first mobile router according to claim 14, further comprising:

means for setting up a secondary tunnel from the first mobile router via the second mobile router, the second external access, and the home agent of the second mobile router to the home agent of the mobile router;

wherein the means for providing includes means for adding to the data packet, an address related to the first mobile router, said address related to the mobile router having the address prefix of the second mobile router; and wherein the communication means transmits the data packet through the secondary tunnel to the second mobile router.

16. The first mobile router according to claim 14, wherein the means for providing includes means for translating the source address of the data packet to a second source address having the prefix of the second mobile router.

17. A non-transitory memory of a digital computer device residing in a first mobile router of a moving network, said first mobile router accessing a first external access, said non-transitory memory storing a computer program comprising software code portions that cause the first mobile router to perform the following steps when the computer program is run on the digital computer device:

advertising by the first mobile router, a first address prefix;

receiving a data packet originating from a moving network node in the moving network, said data packet having a source address having the first address prefix; and routing the data packet to a home agent in a home network related to the moving network, said routing step comprising:

setting up by the first mobile router, a primary tunnel over the first external access to the home agent of the first mobile router;

selecting a second external access for routing the data packet to a home agent of a second mobile router, wherein the second mobile router accesses a second external access and advertises a second address prefix, wherein the first mobile router stores information regarding the first external access and the second external access, and wherein the step of selecting is based on information in the data packet, on the information regarding the first and the second external accesses, and on access selection policies stored in the first mobile router;

detecting that the source address of the data packet has an address prefix different from the address prefix advertised by the second mobile router;

providing the data packet with a different source address usable for routing the data packet to the home agent of the second mobile router, said different source address having the second address prefix; and transmitting the data packet via the selected external access to the home agent of the second mobile router;

wherein the computer program also causes the first mobile router to synchronize the access selection policies and the information regarding the first external access and the second external access with the second mobile router.

* * * * *